United States Patent
Rolfe et al.

(10) Patent No.: US 11,218,480 B2
(45) Date of Patent: *Jan. 4, 2022

(54) AUTHENTICATOR CENTRALIZATION AND PROTECTION BASED ON AUTHENTICATOR TYPE AND AUTHENTICATION POLICY

(71) Applicant: Payfone, Inc., New York, NY (US)

(72) Inventors: Andrew Robert Rolfe, Deerfield, IL (US); Alan Dundas, Los Altos Hills, CA (US); Gregory Slowiak, Cary, IL (US)

(73) Assignee: Payfone, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,157

(22) Filed: Mar. 12, 2020

(65) Prior Publication Data

US 2020/0351267 A1   Nov. 5, 2020

Related U.S. Application Data

(63) Continuation of application No. 16/268,243, filed on Feb. 5, 2019, now Pat. No. 10,616,222, which is a
(Continued)

(51) Int. Cl.
*H04L 29/06* (2006.01)
*H04L 12/08* (2006.01)
*H04L 29/08* (2006.01)

(52) U.S. Cl.
CPC .......... *H04L 63/0884* (2013.01); *H04L 63/06* (2013.01); *H04L 63/0861* (2013.01); *H04L 63/0853* (2013.01); *H04L 2463/082* (2013.01)

(58) Field of Classification Search
CPC .. H04L 63/0884; H04L 63/06; H04L 63/0861
(Continued)

(56) References Cited

U.S. PATENT DOCUMENTS

| 5,727,163 A | 3/1998 | Bezos |
| 6,891,953 B1 | 5/2005 | Demello et al. |

(Continued)

FOREIGN PATENT DOCUMENTS

| JP | 2011227879 A | 11/2011 |
| JP | 2015209718 A | 11/2015 |

(Continued)

OTHER PUBLICATIONS

"iOS Security", Apple, Feb. 2014, 33 pages.
(Continued)

*Primary Examiner* — Haresh N Patel
(74) *Attorney, Agent, or Firm* — Berkeley Law & Technology Group, LLP

(57) ABSTRACT

Provided is a method for authenticating a user communicating with an enterprise via a network. The method includes receiving, via the network, authenticators for a user from a first user device associated with the user, and storing the received authenticators. A first authenticator from the stored authenticators is selected to be used for authenticating the user based on an authentication policy received from the enterprise. An authentication request is transmitted to a user device requesting the first authenticator and the user is authentication by comparing the received authenticator with the stored first authenticator.

20 Claims, 11 Drawing Sheets

Related U.S. Application Data continuation of application No. 16/115,281, filed on Aug. 28, 2018, now Pat. No. 10,250,602, which is a continuation of application No. 15/269,287, filed on Sep. 19, 2016, now Pat. No. 10,084,782.

(60) Provisional application No. 62/221,435, filed on Sep. 21, 2015.

(58) Field of Classification Search
USPC .......................................................... 726/6
See application file for complete search history.

(56) References Cited

U.S. PATENT DOCUMENTS

| | | |
|---|---|---|
| 7,103,261 B2 | 9/2006 | Grecia |
| 7,254,235 B2 | 8/2007 | Boudreault et al. |
| 7,343,014 B2 | 3/2008 | Sovio et al. |
| 7,526,650 B1 | 4/2009 | Wimmer |
| 7,769,998 B2 | 8/2010 | Lynch et al. |
| 8,001,612 B1 | 8/2011 | Wieder |
| 8,402,555 B2 | 3/2013 | Grecia |
| 8,494,576 B1 | 7/2013 | Bye et al. |
| 8,533,860 B1 | 9/2013 | Grecia |
| 8,731,276 B2 | 5/2014 | Mizutani et al. |
| 8,887,308 B2 | 11/2014 | Grecia |
| 9,113,047 B2 | 8/2015 | Onuma et al. |
| D769,296 S | 10/2016 | Grecia |
| 9,465,921 B1 * | 10/2016 | Ramzan ............... G06F 21/552 |
| 9,614,845 B2 | 4/2017 | Rolfe |
| D826,955 S | 8/2018 | Grecia |
| 10,084,782 B2 | 9/2018 | Rolfe et al. |
| 10,250,602 B2 | 4/2019 | Rolfe et al. |
| D857,054 S | 8/2019 | Grecia |
| D857,712 S | 8/2019 | Grecia |
| 10,397,780 B2 | 8/2019 | Rolfe |
| 10,616,222 B2 | 4/2020 | Rolfe et al. |
| 2003/0165328 A1 | 9/2003 | Grecia |
| 2005/0065891 A1 | 3/2005 | Lee et al. |
| 2005/0144452 A1 | 6/2005 | Lynch et al. |
| 2005/0203959 A1 | 9/2005 | Muller et al. |
| 2006/0212401 A1 | 9/2006 | Ameerally et al. |
| 2007/0156726 A1 | 7/2007 | Levy |
| 2008/0010685 A1 | 1/2008 | Holtzman et al. |
| 2008/0065884 A1 * | 3/2008 | Emeott .............. H04W 12/0602 713/168 |
| 2008/0072048 A1 * | 3/2008 | Brown .................... G06F 21/34 713/173 |
| 2008/0091606 A1 | 4/2008 | Grecia |
| 2008/0222199 A1 | 9/2008 | Tiu et al. |
| 2008/0313264 A1 | 12/2008 | Pestoni |
| 2008/0313714 A1 | 12/2008 | Fetterman et al. |
| 2009/0018909 A1 | 1/2009 | Grecia |
| 2009/0083541 A1 | 3/2009 | Levine |
| 2009/0119207 A1 | 5/2009 | Grecia |
| 2009/0265775 A1 | 10/2009 | Wisely et al. |
| 2010/0010906 A1 | 1/2010 | Grecia |
| 2010/0100899 A1 | 4/2010 | Bradbury et al. |
| 2010/0185868 A1 | 7/2010 | Grecia |
| 2010/0275248 A1 * | 10/2010 | Li ............................ H04L 29/04 726/4 |
| 2011/0099382 A1 | 4/2011 | Grecia |
| 2011/0149926 A1 * | 6/2011 | Li ........................ H04W 48/04 370/338 |
| 2011/0162036 A1 * | 6/2011 | Heo ...................... G06F 21/608 726/1 |
| 2011/0185413 A1 * | 7/2011 | Fujii ....................... G06F 21/32 726/7 |
| 2011/0288946 A1 | 11/2011 | Baiya et al. |
| 2012/0084850 A1 * | 4/2012 | Novak .................. G06F 21/575 726/8 |
| 2012/0150687 A1 | 6/2012 | Hart |
| 2012/0151220 A1 | 6/2012 | Grecia |
| 2012/0311660 A1 * | 12/2012 | Park ...................... H04L 63/104 726/1 |
| 2013/0091544 A1 * | 4/2013 | Oberheide .............. G06F 21/34 726/1 |
| 2013/0104187 A1 * | 4/2013 | Weidner .................. G06F 21/45 726/1 |
| 2013/0227651 A1 * | 8/2013 | Schultz ............... H04L 63/0861 726/4 |
| 2013/0246281 A1 * | 9/2013 | Yamada ................ H04L 9/3231 705/71 |
| 2014/0304778 A1 | 10/2014 | Grecia |
| 2015/0161378 A1 * | 6/2015 | Oberheide .............. G06F 21/45 726/1 |
| 2015/0287026 A1 * | 10/2015 | Yang ...................... G06Q 20/06 705/69 |
| 2015/0294313 A1 * | 10/2015 | Kamal ................. G06Q 20/401 705/44 |
| 2016/0132673 A1 * | 5/2016 | Birk ........................ G06F 21/30 726/19 |
| 2016/0162893 A1 * | 6/2016 | Kamal ................. G06Q 20/405 705/44 |
| 2016/0308862 A1 * | 10/2016 | Rolfe .................... H04L 9/3242 |
| 2017/0109751 A1 * | 4/2017 | Dunkelberger ....... H04L 9/3226 |
| 2017/0132922 A1 | 5/2017 | Gupta et al. |
| 2017/0150349 A1 * | 5/2017 | Huh ...................... H04L 9/3242 |

FOREIGN PATENT DOCUMENTS

| | | |
|---|---|---|
| WO | 2011080882 A1 | 7/2011 |
| WO | 2012053105 A1 | 4/2012 |
| WO | 2017038123 A1 | 3/2017 |
| WO | 2018164172 A1 | 9/2018 |

OTHER PUBLICATIONS

"Register for NoPass", NoPass, https://web.archive.org/web/20141204002706/http://www.nopassapp.com:80/register/, accessed May 11, 2021, 1 page.

"Try NoPass and Login Here!", NoPass, https://web.archive.org/web/20141205184413/http://www.nopassapp.com:80/login/, accessed May 11, 2021, 1 page.

NoPass, http://web.archive.org/web/20150328095715/https7/www.nopassapp.com/, accessed May 11, 2021, 4 pages.

Rose et al., "Zero Trust Architecture", National Institute of Standards and Technology (NIST), NIST Special Publication 800-207, Aug. 2020, 59 pages.

Warner, "iOS Security: How Apple Protects Data on iOS Devices—Part 1", Constant Contact Tech Blog, Dec. 8, 2014, http://techblog.constantcontract.com/software-development/ios-security/, accessed May 11, 2021, 4 pages.

Application, U.S. Appl. No. 17/127,976, filed Dec. 18, 2020, 142 pages.

Informational Notice to Applicant, U.S. Appl. No. 17/127,976, dated Feb. 10, 2021, 2 pages.

Filing Receipt, U.S. Appl. No. 17/127,976, mailed Feb. 10, 2021, 3 pages.

Notice of Publication, U.S. Appl. No. 17/127,976, dated Jul. 1, 2021, 1 page.

Application, U.S. Appl. No. 62/956,020, filed Dec. 31, 2019, 117 pages.

Filing Receipt, U.S. Appl. No. 62/956,020, mailed Jan. 8, 2020, 3 pages.

Application, U.S. Appl. No. 15/269,287, filed Sep. 19, 2016, 90 pages.

Filing Receipt and Informational Notice to Applicant, U.S. Appl. No. 15/269,287, dated Sep. 29, 2016, 5 pages.

Power of Attorney, U.S. Appl. No. 15/269,287, filed Jan. 19, 2017, 4 pages.

Notice of Acceptance of Power of Attorney, U.S. Appl. No. 15/269,287, dated Jan. 26, 2017, 2 pages.

Notice of Publication, U.S. Appl. No. 15/269,287, dated Mar. 23, 2017, 1 page.

Notice of Allowance, U.S. Appl. No. 15/269,287, dated May 25, 2018, 33 pages.

(56) References Cited

OTHER PUBLICATIONS

Corrected ADS and 312 Amendment, U.S. Appl. No. 15/269,287, filed Jul. 24, 2018, 27 pages.
Corrected Filing Receipt, U.S. Appl. No. 15/269,287, mailed Jul. 26, 2018, 4 pages.
Response to Amendment under Rule 312, U.S. Appl. No. 15/269,287, dated Aug. 6, 2018, 3 pages.
Issue Fee Payment, U.S. Appl. No. 15/269,287, filed Aug. 24, 2018, 5 pages.
Issue Notification, U.S. Appl. No. 15/269,287, dated Sep. 5, 2018, 1 page.
Application, U.S. Appl. No. 16/115,281, filed Aug. 28, 2018, 82 pages.
Filing Receipt, U.S. Appl. No. 16/115,281, mailed Sep. 14, 2018, 4 pages.
Terminal Disclaimer, U.S. Appl. No. 16/115,281, filed Nov. 1, 2018, 4 pages.
Approval of Terminal Disclaimer, U.S. Appl. No. 16/115,281, mailed Nov. 1, 2018, 3 pages.
Notice of Allowance, U.S. Appl. No. 16/115,281, dated Nov. 21, 2018, 41 pages.
Notice of Publication, U.S. Appl. No. 16/115,281, dated Dec. 20, 2018, 1 page.
Issue Fee Payment, U.S. Appl. No. 16/115,281, filed Feb. 14, 2019, 10 pages.
Issue Notification, U.S. Appl. No. 16/115,281, dated Mar. 13, 2019, 1 page.
Application, U.S. Appl. No. 16/268,243, filed Feb. 5, 2019, 78 pages.
Power of Attorney, U.S. Appl. No. 16/268,243, filed Mar. 4, 2019, 6 pages.
Notice to File Corrected Application Papers, U.S. Appl. No. 16/268,243, dated Mar. 12, 2019, 2 pages.
Filing Receipt, U.S. Appl. No. 16/268,243, mailed Mar. 12, 2019, 4 pages.
Notice to File Corrected Application Papers, U.S. Appl. No. 16/268,243, dated Mar. 22, 2019, 2 pages.
Filing Receipt, U.S. Appl. No. 16/268,243, mailed Mar. 22, 2019, 4 pages.
Notice of Incomplete Reply, U.S. Appl. No. 16/268,243, dated Apr. 29, 2019, 2 pages.
Response to Notice to File Corrected Application Papers, U.S. Appl. No. 16/268,243, filed May 9, 2019, 16 pages.
Updated Filing Receipt, U.S. Appl. No. 16/268,243, mailed May 14, 2019, 4 pages.
Non-Final Office Action, U.S. Appl. No. 16/268,243, dated Jul. 10, 2020, 40 pages.
Notice of Publication, U.S. Appl. No. 16/268,243, dated Aug. 22, 2019, 1 page.
Amendment and Terminal Disclaimer, U.S. Appl. No. 16/268,243, filed Oct. 9, 2019, 13 pages.
Notice of Allowance, U.S. Appl. No. 16/268,243, dated Nov. 27, 2019, 20 pages.
Issue Fee Payment, U.S. Appl. No. 16/268,243, filed Feb. 26, 2020, 4 pages.
Issue Notification, U.S. Appl. No. 16/268,243, dated Mar. 18, 2020, 1 page.
Application, U.S. Appl. No. 17/315,081, filed May 7, 2021, 86 pages.
Filing Receipt, U.S. Appl. No. 17/315,081, mailed May 17, 2021, 5 pages.
Power of Attorney, U.S. Appl. No. 17/315,081, filed Jun. 24, 2021, 4 pages.
Notice of Acceptance of Power of Attorney, U.S. Appl. No. 17/315,081, dated Jun. 29, 2021, 1 page.
Application, International Application No. PCT/US2020/066475, filed Dec. 21, 2020, 77 pages.
Notification of the International Application Number and of the International Filing Date, International Application No. PCT/US2020/066475, dated Jan. 19, 2021, 1 page.
Notification Concerning Payment of Prescribed Fees, International Application No. PCT/US2020/066475, dated Jan. 19, 2021, 2 pages.
Notification of Receipt of Search, International Application No. PCT/US2020/066475, dated Jan. 19, 2021, 1 page.
Notification of Receipt of Record, International Application No. PCT/US2020/066475, dated Feb. 2, 2021, 1 page.
Notification Concerning Submission of Priority Document, International Application No. PCT/US2020/066475, dated Feb. 3, 2021, 1 page.
Notification Concerning Submission of Priority Document, International Application No. PCT/US2020/066475, dated Feb. 11, 2021, 1 page.
Notification of Transmittal of the International Search Report and the Written Opinion, International Application No. PCT/US2020/066475, dated Mar. 17, 2021, 1 page.
International Search Report, International Application No. PCT/US2020/066475, dated Mar. 17, 2021, 2 pages.
Written Opinion, International Application No. PCT/US2020/066475, dated Mar. 17, 2021, 7 pages.
Notification Concerning Availability of the Publication, International Application No. PCT/US2020/066475, dated Jul. 8, 2021, 1 page.
First Notice Informing the Applicant of the Communication of the International Application, International Application No. PCT/US2020/066475, dated Aug. 5, 2021, 1 page.
Application, U.S. Appl. No. 14/687,327, filed Apr. 15, 2015, 71 pages.
Filing Receipt, U.S. Appl. No. 14/687,327, mailed Apr. 28, 2015, 3 pages.
Power of Attorney, U.S. Appl. No. 14/687,327, filed May 6, 2015, 4 pages.
Notice of Acceptance of Power of Attorney, U.S. Appl. No. 14/687,327, dated May 11, 2015, 1 page.
Non-Final Office Action, U.S. Appl. No. 14/687,327, dated Jul. 1, 2016, 15 pages.
Notice of Publication, U.S. Appl. No. 14/687,327, dated Oct. 20, 2016, 1 page.
Response to Non-Final Offie Action, U.S. Appl. No. 14/687,327, filed Nov. 1, 2016, 23 pages.
Notice of Allowance, U.S. Appl. No. 14/687,327, dated Nov. 22, 2016, 17 pages.
Correction of Error in Small Entity Status, U.S. Appl. No. 14/687,327, filed Dec. 5, 2016, 6 pages.
Power of Attorney, U.S. Appl. No. 14/687,327, filed Dec. 21, 2016, 4 pages.
Corrected Notice of Allowability and Examiner's Amendment, U.S. Appl. No. 14/687,327, dated Dec. 27, 2016, 6 pages.
Notice of Acceptance of Power of Attorney, U.S. Appl. No. 14/687,327, dated Dec. 28, 2016, 2 pages.
Change of Address, U.S. Appl. No. 14/687,327, mailed Dec. 30, 2016, 1 page.
Issue Fee Payment, U.S. Appl. No. 14/687,327, filed Feb. 22, 2017, 3 pages.
Issue Notification, U.S. Appl. No. 14/687,327, dated Mar. 15, 2017, 1 page.
Power of Attorney, U.S. Appl. No. 14/687,327, filed Jul. 7, 2021, 7 pages.
Notice of Acceptance of Power of Attorney, U.S. Appl. No. 14/687,327, filed Jul. 13, 2021, 2 pages.
Application, U.S. Appl. No. 15/443,900, filed Feb. 27, 2017, 62 pages.
Filing Receipt, U.S. Appl. No. 15/443,900, mailed Mar. 8, 2017, 3 pages.
Notice to File Missing Parts, U.S. Appl. No. 15/443,900, dated Mar. 8, 2017, 2 pages.
Filing Fees, U.S. Appl. No. 15/443,900, filed May 8, 2017, 4 pages.
Preliminary Amendment, U.S. Appl. No. 15/443,900, filed May 17, 2017, 11 pages.
Filing Receipt and Informational Notice to Applicant, U.S. Appl. No. 15/443,900, dated May 19, 2017, 5 pages.
Response to Informational Notice, U.S. Appl. No. 15/443,900, filed Jun. 29, 2017, 13 pages.

(56) References Cited

OTHER PUBLICATIONS

Notice re Power of Attorney and Response to Request to Correct Filing Receipt, U.S. Appl. No. 15/443,900, dated Jul. 6, 2017, 2 pages.
Power of Attorney and Updated ADS, U.S. Appl. No. 15/443,900, filed Nov. 17, 2017, 12 pages.
Notice of Acceptance of Power of Attorney, U.S. Appl. No. 15/443,900, dated Jul. 14, 2017, 1 page.
Corrected Filing Receipt, U.S. Appl. No. 15/443,900, mailed Jul. 14, 2017, 3 pages.
Notice of Publication, U.S. Appl. No. 15/443,900, dated Aug. 24, 2017, 1 page.
Non-Final Office Action, U.S. Appl. No. 15/443,900, dated Jan. 25, 2019, 11 pages.
Response to Office Action and Terminal Disclaimer, U.S. Appl. No. 15/443,900, filed Mar. 5, 2019, 20 pages.
Notice of Allowance, U.S. Appl. No. 15/443,900, dated Apr. 12, 2019, 17 pages.
Issue Fee Payment, U.S. Appl. No. 15/443,900, filed Jul. 9, 2019, 9 pages.
Issue Notification, U.S. Appl. No. 15/443,900, dated Aug. 7, 2019, 1 page.
Power of Attorney, U.S. Appl. No. 15/443,900, filed Jul. 7, 2021, 7 pages.
Notice of Acceptance of Power of Attorney, U.S. Appl. No. 15/443,900, dated Jul. 13, 2021, 2 pages.
Application, U.S. Appl. No. 16/521,374, filed Jul. 24, 2019, 67 pages.
Filing Receipt, U.S. Appl. No. 16/521,374, mailed Aug. 7, 2019, 4 pages.
Notice of Publication, U.S. Appl. No. 16/521,374, dated Nov. 14, 2019, 1 page.
Third-Party Submission, U.S. Appl. No. 16/521,374, filed Apr. 10, 2020, 10 pages.
Acceptance of Third-Party Submission, U.S. Appl. No. 16/521,374, mailed Apr. 15, 2020, 2 pages.
Non-Final Office Action, U.S. Appl. No. 16/521,374, dated Feb. 4, 2021, 29 pages.
Request for Corrected Filing Receipt, Power of Attorney and 3.73C, U.S. Appl. No. 16/521,374, filed Feb. 9, 2021, 16 pages.
Corrected Filing Receipt and Acceptance of Power of Attorney, U.S. Appl. No. 16/521,374, mailed Feb. 11, 2021, 4 pages.
Terminal Disclaimer, U.S. Appl. No. 16/521,374, filed Apr. 29, 2021, 6 pages.
Acceptance of Terminal Disclaimer, U.S. Appl. No. 16/521,374, mailed Apr. 29, 2021, 1 page.
Amendment, U.S. Appl. No. 16/521,374, filed Apr. 29, 2021, 18 pages.
Notice of Allowance, U.S. Appl. No. 16/521,374, dated May 13, 2021, 22 pages.
Corrected Notice of Allowability, U.S. Appl. No. 16/521,374, dated May 25, 2021, 6 pages.
Application, International Application No. PCT/JP2019/034399, filed Sep. 2, 2019, 57 pages.
PCT Request, International Application No. PCT/JP2019/034399, filed Sep. 2, 2019, 4 pages.
Notification of Receipt of Record, International Application No. PCT/JP2019/034399, dated Sep. 11, 2019, 1 page.
Notification re Priority Document Submitted, International Application No. PCT/JP2019/034399, dated Sep. 12, 2019, 44 pages.
Notification Concerning Submission of Priority Document, International Application No. PCT/JP2019/034399, dated Sep. 17, 2019, 1 page.
International Search Report, International Application No. PCT/JP2019/034399, dated Nov. 19, 2019, 5 pages.
Written Opinion of the International Searching Authority, International Application No. PCT/JP2019/034399, dated Nov. 19, 2019, 13 pages.
International Publication with International Search Report, International Application No. PCT/JP2019/034399, dated Apr. 2, 2020, 62 pages.
Notification Concerning Availability of the Publication, International Application No. PCT/JP2019/034399, dated Apr. 2, 2020, 1 page.
First Notice Informing the Applicant of the Communication of the International Application, International Application No. PCT/JP2019/034399, dated Apr. 30, 2020, 1 page.
Second Notice Informing the Applicant of the Communication of the International Application, International Application No. PCT/JP2019/034399, dated Jan. 28, 2021, 1 page.
Document Request from Authorities, International Application No. PCT/JP2019/034399, filed Mar. 10, 2021, 1 page.
Communication re English Translation of the Written Opinion, International Application No. PCT/JP2019/034399, dated Mar. 10, 2021, 10 pages.
International Preliminary Report on Patentability with Translation, International Application No. PCT/JP2019/034399, dated Mar. 23, 2021, 15 pages.
Notification Concerning Transmittal of Translation of the International Preliminary Report on Patentability, International Application No. PCT/JP2019/034399, dated Apr. 8, 2021, 1 page.
International Application Status Report, International Application No. PCT/JP2019/034399, filed May 12, 2021, 2 pages.

* cited by examiner

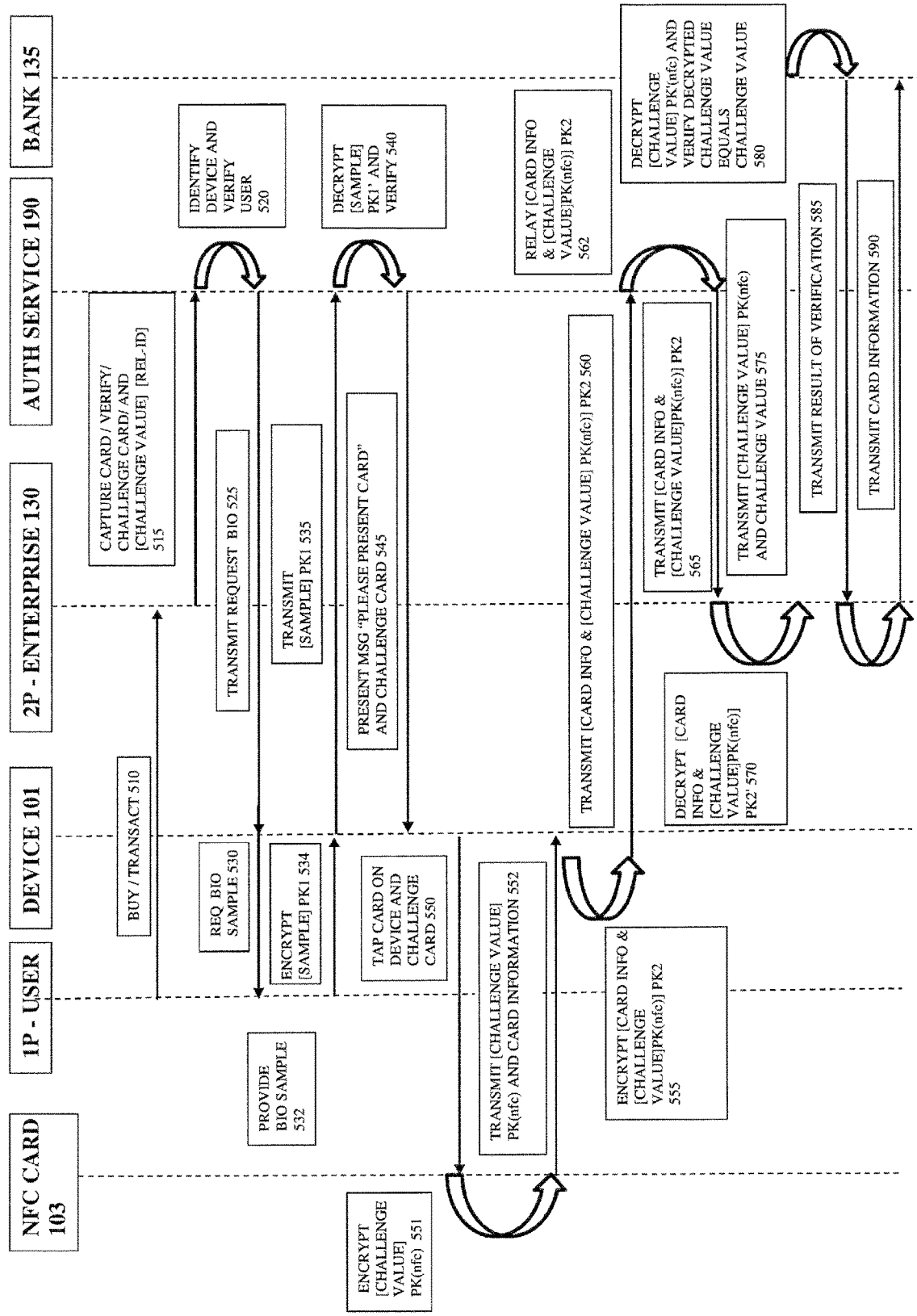

| TABLE 1. CREDENTIAL MATRIX - ACCOUNT ID (A-ID) | | | |
|---|---|---|---|
| CATEGORY | TYPE | ATTRIBUTE | DEVICE |
| BIOMETRIC | Voice (aspects of user's voice) | Sample type; liveness detection | DEV 1, DEV 2 |
| | Face (aspects of user's face) | Sample type; liveness detection | DEV 2 |
| | Hand (aspects of user's hand) | Sample type; liveness detection | |
| | Finger (aspects of user's finger) | Fingerprint; Sample type; liveness detection | DEV 1; DEV 2 |
| | Eye (aspects of user's eyes) | Sample type; liveness detection | DEV 2 |
| KNOWLEDGE | Pin-Pass - shared secret | Length of data; input hardware (entry protection) | DEV 1, DEV 2 |
| | Challenge and Response - shared secret | Length of data; input hardware | DEV 1, DEV 2 |
| | One Time Passcode - random; temporal | Length of data; input hardware | DEV 1, DEV 2 |
| | Pattern - shared secret | Length of data; input hardware | DEV 1, DEV 2 |
| POSSESSION | Key - local cryptographic key | Type of key | DEV 1, DEV 2 |
| | Token - separate physical hardware | Proximity; human detection (presence) | DEV 2 |
| | Location - location of user or device | Manner of determining location | DEV 1 |

FIG. 6

AUTHENTICATOR CENTRALIZATION AND PROTECTION BASED ON AUTHENTICATOR TYPE AND AUTHENTICATION POLICY

CROSS-REFERENCE TO RELATED APPLICATION

This application is a continuation of U.S. application Ser. No. 16/268,243, filed Feb. 5, 2019, now U.S. Pat. No. 10,616,222, entitled "AUTHENTICATOR CENTRALIZATION AND PROTECTION BASED ON AUTHENTICATOR TYPE AND AUTHENTICATION POLICY," which is a continuation of U.S. application Ser. No. 16/115,281, filed Aug. 28, 2018, now U.S. Pat. No. 10,250,602, entitled "AUTHENTICATOR CENTRALIZATION AND PROTECTION," which is a continuation application of U.S. application Ser. No. 15/269,287, filed Sep. 19, 2016, now U.S. Pat. No. 10,084,782, entitled "AUTHENTICATOR CENTRALIZATION AND PROTECTION," which claims priority to U.S. Provisional Application No. 62/221,435, filed Sep. 21, 2015, entitled "AUTHENTICATOR CENTRALIZATION AND PROTECTION," the disclosures of which are incorporated by reference herein in their entireties.

TECHNICAL FIELD

This invention relates to security and privacy. More particularly it relates to authentication and/or authorization performed via a communications network based on user credentials and/or other authenticators.

BACKGROUND

1. Authentication and Identification

User authentication techniques, such as those relying on conventional passwords, one time passwords (OTPs), or hardware or software smartcards, etc., have all too often proven to be either too weak and susceptible to attacks, such as man in the middle (MITM) or man in the browser (MITB) attacks, or too cumbersome and expensive. The use of single sign on techniques such as OpenID, FaceBook Connect, etc., only make the problem worse, as once the attacker has compromised the master account, the attacker can access all other accounts that rely on the initial login. Further, the focus of attackers has shifted from trying to break the login process to using sophisticated techniques to come in after the user has logged-in and attacking transactions as they are being performed. This has made transaction authentication, the act of confirming if the transaction seen at the back end web server is identical to that intended by the user, even more important.

When considering authentication, one must necessarily consider identification. An important concept when considering identification is that each one us is a single person—a single carbon based unit. We have one identity in reality, but in the digital world we tend to have multiple digital representations of identity with multiple enterprises—a Facebook™ identity, an Amazon™ identity, multiple banking identities (mortgage, savings account, etc.), and so on. So each of us has multiple digital identities and each of these enterprises has a responsibility to manage these identities and to verify that the users of their system are the correct intended user. Additionally, different enterprises have different responsibilities. Banks and other financial institutions, for example, have a regulatory responsibility—to know their customers. They are required to a certain degree to know that you are correctly identified. Other enterprises, such as Facebook™, are not so much concerned with your identity for regulatory purposes, but because they want to share your information with other users—their need to identify is different. So each of these enterprises has a different set of what is essentially identity attributes about you in their database and they use these attributes of your identity to verify that you are who you say you are when you use the services provided by the enterprise.

It is common for most enterprises to require that a user select a user name and password, often referred to as user credentials, at the time the user establishes a relationship with the enterprise. These are shared secrets for subsequent use by the enterprise to verify you are who you say you are when accessing the enterprise website. However, banks and other financial institutions may require more. These institutions often require additional credentials, such as a social security number or some other personal information. That is, banks and other financial institutions typically subject you to more careful examination or scrutiny by requesting other identity related information, which are also often referred to as user credentials, when you initially establish a relationship with the institution, but thereafter rely primarily on your user name and password, and only secondarily on such other identity related information, to verify that you are who you say you are, i.e. to verify your identity, when accessing the institution's website.

Enterprises can also utilize information about what you possess (a credit card, a key, a token, etc.) to verify your identity. A bank issues you a credit or debit card, and can ask for the account number and other information associated with the card, to verify you still possess it. Some cards and tokens have computing capabilities built-in, and can generate unique values when challenged. Those knowledgeable in the art know that this often comes in the form of sending a random value to the token, and the token then cryptographically signs that random value using a private key stored on the token. When the token was issued, the matching public key was stored in association with the identity information of the user who was issued the token. When a token is challenged, the challenger can cryptographically verify which private key was used to sign the random value, and therefore verify the website visitor has possession, in real-time, of the token. By association then, the website could assume the visitor is the same person who was issued the token. A thief could steal the token however and potentially be inappropriately identified.

Thus, each enterprise has digital data that represents the shared secrets and/or information about a user that the enterprise uses to verify that specific user's identity. Because most users deal with multiple enterprises, an individual user is required to have many user names and passwords, each associated with an established enterprise relationship. Often, to simply a user's life, they will choose the same password or other shared secret for every enterprise.

However, under the models of authentication discussed above, when security is compromised, the identity of the user and the credentials used to authenticate the user, e.g., passwords, social security number, credit card information, etc., can be stolen and used to impersonate the user to the enterprise. This is because the identity of the user and the user's credentials are both maintained by the applicable enterprise. The compromise escalates if the same password from the compromised enterprise can be used to authenticate at a different enterprise.

Therefore, a successful attack on the enterprise can, and indeed has, resulted in not only a breach of the user's credentials, but also of the user's identity. That is, in a single attack, attackers have been able to steal not only the user's credentials used for a particular enterprise, but also the user's identity information which the enterprise associates with those credentials. Thus, if someone attacks one enterprise's information, they can get both the user's identity and the user's credentials, possibly allowing the attacker to impersonate the user at multiple enterprises, which is a catastrophic loss.

2. Shared User Credentials

Each enterprise requires a different level of trust or confidence in the authentication of its users. Each has its own policies and criteria established with respect to authentication. In the banking world authentication policy and criteria are based on risk management. What type of device is the user using? Has the user ever paid this payee before? What's the dollar amount of the transaction, etc. Accordingly, if a user wants to move $5000.00, the bank website is going to prompt the user for a different credential, or additional credentials to provide a higher level of trust for the authentication, than it would if the user wanted to move only $10.00.

Additionally, an enterprise may want to utilize various credentials and other authenticators for the authentication and authorization process in a variety of different ways. This means that there is essentially a matrix of possibilities: using different categories of authenticators that represent something you have (i.e. something in your possession), something you know (something within your knowledge), and/or something you are (your biometric). Furthermore, the enterprise may have multiple choices within each one of those categories. Something you have could be a phone or access to a phone call, or smart card, or token. Something you know could be your mother's maiden name, your password, your preselected gesture or pattern, or which picture is the one that you chose when you logged in or when you set up the account. Something you are could be your fingerprint, your voice pattern, your face or some other biometric. Consequently, there are numerous possible authenticators that can be used for authentication.

Each type of authenticator has its strengths and weaknesses. An authenticator which verifies knowledge, like a password or shared secret, costs nothing, can be easily replaced, but must be memorized and can be stolen. An authenticator which verifies procession, like a key or token, does not have to be memorized, can be cryptographically challenged, but can be lost or stolen. A biometric authenticator requires human interaction to capture a human attribute and therefore verifies a human is involved, cannot be lost by the user, but requires special equipment to be sampled, and to ensure the sample is from a live human to avoid replay or spoofing. That is why high security applications usually require use of multiple types of authenticators (also described as multiple factors of authentication).

There are also numerous ways to receive and sample these authenticators. As technology advances, devices evolve and today many users have multiple different devices, each with different capabilities, and thus, a myriad of potential authenticators at their disposal. The problem is that each user may utilize multiple different devices at different times or even at the same time, and different users may utilize different devices with different capabilities. Furthermore, users will upgrade their devices at various times unbeknownst to the enterprise. Thus, it is an arduous task for the banks, and other enterprises, to keep a valid profile for every user—it is a challenge for every user to continuously inform each enterprise of their new/upgraded devices, its capabilities, and thus, the potential authenticators available for authenticating the user.

3. Usage of Wireless Credential Devices—Access & Emulation

Today, if you look at certain credit cards, subway cards or other payment cards that can be used to pay for products or services, you will see a symbol that looks like a speaker. That symbol indicates that the card supports Near Field Communications (NFC), which are commonly referred to as NFC readable devices. Such NFC readable cards can be tapped on a NFC enabled point-of-sale (POS) terminal, and the POS terminal will read the desired information (e.g. credit card number and expiration date, or value remaining on a subway card etc.) off the card wirelessly. Additionally, smartphones are now enabled with NFC capabilities—they can act as an NFC readable device and can also read NFC readable devices. Accordingly, if you have an NFC enabled smartphone, you can tap an NFC readable card on your phone, the phone, like a POS terminal, can read it wirelessly. NFC enabled devices, including NFC enabled POS terminals and smartphones, are sometimes referred to as NFC readers. Thus, with NFC readable cards it is no longer necessary for the user to copy the information from the card into a website purchase form, or to physically insert the card into a POS terminal or to swipe the card's magnetic stripe. Instead, all that is required is that the card be tapped against an NFC reader and the NFC reader communicates wirelessly with the card to gather the desired information from the card.

Additionally, authentication tokens, such as RSA secure ID tokens, are in common usage, with some banks offering these tokens to their end user customers—typically high valued end user customers. In order to convince a customer to utilize such tokens, the bank might say to the end user, if you really want to protect your high dollar account, we will send you one of these tokens and you will have to use it to log-in in order to access your account. These authentication tokens can be wirelessly readable as well, via many different wireless communication methods like NFC, BLE (Bluetooth Low Energy), and others available now or in the future. Thus, it would be beneficial if the expanding usage of these wirelessly readable devices in concert with smartphones and other devices could somehow be utilized to provide even stronger authentication and verification. These devices are also referred to herein as low energy wireless devices—they do not require much energy and must be proximate to the device with which they are communicating.

Further, it should be noted that encoded information can also be transmitted and received using mobile cameras and microphones. For example, a mobile device can be used to scan a QR code using the camera feature. Additionally, the microphone can also be utilized to pickup encoded audio that can be decoded later to provide information.

4. Attestations, Relationship Information, and Digital Currency

Conventionally, to prove your age you present some sort of credential that has been issued by a trusted third party—e.g. a driver's license issued by a Government Department of Motor Vehicles (DMV) or a passport issued by the United States Government. To prove you have credit, you might show proof that you have an account established with a bank—e.g. show a bank credit card. The proof you provide is typically some type of physical documentation, sometime in the form of a card, issued by a trusted third party. This requires that you carry a physical credential with you to present as a form of attestation. Attestations may be required not only for the purposes referred to above, but for any number of other purposes including to verify your residence, your citizenship, and your employment.

However, there are issues with the use of physical credentials as attestations. For one, these physical credentials often contain additional information which is unnecessary for the required attestation and is information you wish to keep private. Accordingly, when required to prove your age, you may not wish to divulge your residential address or your name. However, when providing a driver's license to attest to the fact that you are over 21 years old, you are necessarily also divulging your name and address because this information is also included on your driver's license, but this information is entirely unnecessary to prove your age. Additionally, if a physical credential is lost or stolen another can obtain all the information contained thereon and you can lose this privacy.

Thus, it would be beneficial if users could somehow provide attestations for various purposes without the need to carry and present physical credentials.

Relationship information is information that is pertinent to a relationship between two parties. For example, relationship information may include preferred customer information for a relationship between a particular purchaser (who is also referred to as a user) and a particular merchant (which is also referred to as an enterprise). If, for instance, the purchaser has spent above a certain threshold amount with the merchant, the merchant may issue a coupon to the purchaser good for a discount on a future purchase. While this may be issued in the form of a physical coupon or card to be held by the purchaser—the information shown on the physical coupon or card may actually be maintained by the merchant in electronic form for the purchaser to use at their discretion until the coupon expires.

Here also, it would be beneficial if users could somehow provide coupons, preferred customer cards and other user-enterprise relational information without the need to carry and present physical coupons, preferred customer cards or other user-enterprise relational information in physical form.

Relationship information also includes digital currency, e.g., bitcoins. With digital currency, possession of the digital currency is necessary. That is, those who possess the digital currency own it. In this regard, the digital currency is similar to cash. There is no other protection available. The person in possession of the digital currency is free to use it. People lose bitcoins—they have been stolen from online exchanges and wallets. Consequently, there is a need for additional security to protect owners of digital currencies.

SUMMARY

According to certain aspects of the invention, a user transacting with an enterprise can be authenticated using credentials enrolled with a third party authentication service. The enterprise need only know the user's identity. That is, the enterprise is not required to generate, store and securely maintain the user's credentials, which can be stolen if the enterprise's information systems are subjected to a security breach. The authentication service, on other hand, need not know the user's true identity. Rather, the authentication service can associate the user's credentials with a particular device by generating a relationship between the enterprise and the user's device. Accordingly, the true identity of the user and the user's credentials are never stored in the same location. This prevents an attacker from getting both the credentials and the user's identity as the result of a successful attack, rendering the obtained information essentially useless.

According to another aspect, by centralizing the user's credentials in a single point, the authentication service, the credentials need not be stored with every enterprise or entity intending to use those credentials to authenticate the user. Consequently, the chances of a having an attacker obtain those credentials through an attack can be further reduced. Another benefit of this centralization is that the user need not update their credentials with every enterprise with whom they engage. Rather, the user need only update their credentials with the authentication service and the enterprise can utilize those credentials by sending a request for authentication to the authentication service with a policy on the authentication so that the authentication service can select the proper credential for authenticating the user.

One manner of implementing these aspects includes receiving the credentials or authenticators for a user from a user device associated with the user storing the received authenticators with the authentication service. When the user seeks to perform a transaction with the enterprise, the enterprise sends a request to authenticate the user with an authentication policy for authenticating the user. The request need not identify which of the stored authenticators is to be used for authenticating as the policy can be used by the authentication service to determine which authenticator of the stored authenticators will be used for authenticating the user. After selecting the preferred authenticator from those stored and associated with the user device, the authentication service sends a request to the user device requesting that the user provide the selected authenticators. After receiving the authenticator, the authentication service authenticates the user by comparing the received authenticator to the selected one stored and provided earlier to the authentication service.

According to another aspect of the invention, the stored authenticators include a plurality of authenticators including at least two different authenticators in different categories of authenticators, the different categories including a knowledge category including information known to the user, a possession category including something physically possessed by the user; and a biometric category identifying physical attributes of the user. More preferably, the authenticators will include one or more of: (i) at least two different authenticators in different categories of authenticators, the different categories including at least two of a knowledge category including information known to the user, a possession category including something physically possessed by the user; and a biometric category identifying physical attributes of the user; (ii) at least two different types of authenticators in a same category of authenticators or (iii) at least two different species of authenticators of the same type of authenticator.

According to another aspect of the invention, a user may enroll multiple devices with the authentication service to be used for authentication. The different user devices may be capable of providing different forms of authentication. In this case, the user enrolls authenticators from a first user device associated with the user and also authenticators for a second user device associated with the user. The authentication service stores these authenticators with an account identifier or account identifiers associated with the user. It is noted that this account identifier need not be, and preferably is not associated with the true identity of the user. In this case, when the authentication service receives a request to authenticate the user with an authentication policy for authenticating the user, the authentication service determine which authenticator from the stored authenticators to be used for authenticating the user based on the authentication policy received from the enterprise. Additionally, the authentication service will select which one of the first user device and the second user device to be use for authenticating the user. The authentication service then transmits an authentication request to the selected one of the first user device and the second user device via the network requesting the authenticator chosen for authentication. After receiving an authenticator from the user device in return, the user can be authenticated by comparing the received authenticator with the stored authenticator.

Another aspect of the invention relates to establishing multiple relationships between the entities, including establishing key pairs between the various entities to enable encryption and decryption capabilities between any two parties of the three party system. These relationships can be used in combination with the centralized authentication system described above to provide for enhance security. This includes establishing an enterprise account between the enterprise and the authentication service and identifying this relationship with an enterprise account identifier. A key pair may be generated for encrypting information exchanged between the enterprise and the authentication service to provide for secure connections between these entities. Another relationship is also established between the user and the enterprise, which is identified using a user identifier to identify the user. Also, a relationship is established between each user device and the authentication service and each of these relationships are identified by a different device identifier. Thus, a particular user may have multiple devices set up in the user account. The user enrolls authenticators through each user device, or a single authenticator across multiple devices, depending upon the capabilities of each device, and these enrolled credentials are associated with the user identifier and optionally with the device identifier through which they are enrolled. Additionally, the authentication service generates a key pair and transmits one key to the user device and stores the other key of the key pair. This may be an asymmetric key pair. These keys are used to encrypt and decrypt information transmitted between the corresponding user device and the authentication service to ensure secure communications.

These keys stored at user device may also be protected in many ways, preferably using hardware protection. However, software protection can also be used, as well as a combination of hardware and software protection.

After establishing these relationships, a relationship may be established between the enterprise and a particular user device. This relationship is established using the authentication service. The authentication service generates a relationship identifier that associates the user device identifier with the enterprise account identifier. The relationship identifier is stored and transmitted to the user device. As a part of this process, the user device generates a key pair, stores one key of the key pair and transmits the other key of the key pair with the relationship identifier to the enterprise through the authentication service using the network. The other key is transmitted with the relationship identifier so that the enterprise knows which key to use for encrypting/decrypting when communicating with a particular user device using the authentication service via the network.

It is perhaps worthwhile to emphasize here that it should be understood that the term "network" is used herein generically to refer to a digital communications network, where the public Internet, local area networks, or private secure networks are some exemplary types. Many of the implementations of this invention will utilize a single type of network for all communication channels, e.g. the Internet, while other implementations can use multiple different network types for different channels (for example the "network" may include multiple different type networks with one channel provided via a private type network, on another channel is provided via the Internet). Thus, it will also be understood that the invention does not require the various different communication channels to be provided via any particular type of network or via the same network type. However, describe herein the preferred implementation uses different secure channels between different pairs of entities to eliminate single channel compromises and increase the difficulty of communication channel attacks on the system.

It should also be understood that the method will typically be implemented by a server having one or more ports through which it communicates via the network and the processor with the program logic, typically but not necessarily executable software, to perform as described above. One or more exemplary embodiments may also be embodied as programmed commands to be executed in various computer means, and then may be recorded to a computer-readable recording medium. The computer-readable recording medium may include one or more of the programmed commands, data files, data structures, or the like. The programmed commands recorded to the computer-readable recording medium may be particularly designed or configured for one or more embodiments of the present disclosure or may be well known to one of ordinary skill in the art. Examples of the computer-readable recording medium include magnetic media including hard disks, magnetic tapes, and floppy disks, optical media including CD-ROMs and DVDs, magneto-optical media including floptical disks, and a hardware apparatus designed to store and execute the programmed commands in ROM, RAM, a flash memory, and the like. Examples of the programmed commands include not only machine codes generated by a compiler but also include great codes to be executed in a computer by using an interpreter. Furthermore, it is understood that one or more of the above-described elements may be implemented as hardware (e.g., circuitry, at least one processor, memory, data lines, etc.), software, or a combination of hardware and software.

BRIEF DESCRIPTION OF THE DRAWINGS

The above and other objects, features, and advantages of the present invention will become more readily apparent from the following detailed description of exemplary embodiments of the invention, taken in conjunction with the accompanying drawings, in which:

FIG. 5 shows another process of a user conducting a transaction with an enterprise using the authentication system in combination with a wireless credential challenge.

FIG. 6 is a table showing a matrix of authenticators/credentials enrolled by a user using the authentication system.

DETAILED DESCRIPTION OF THE INVENTION

Figure 1:
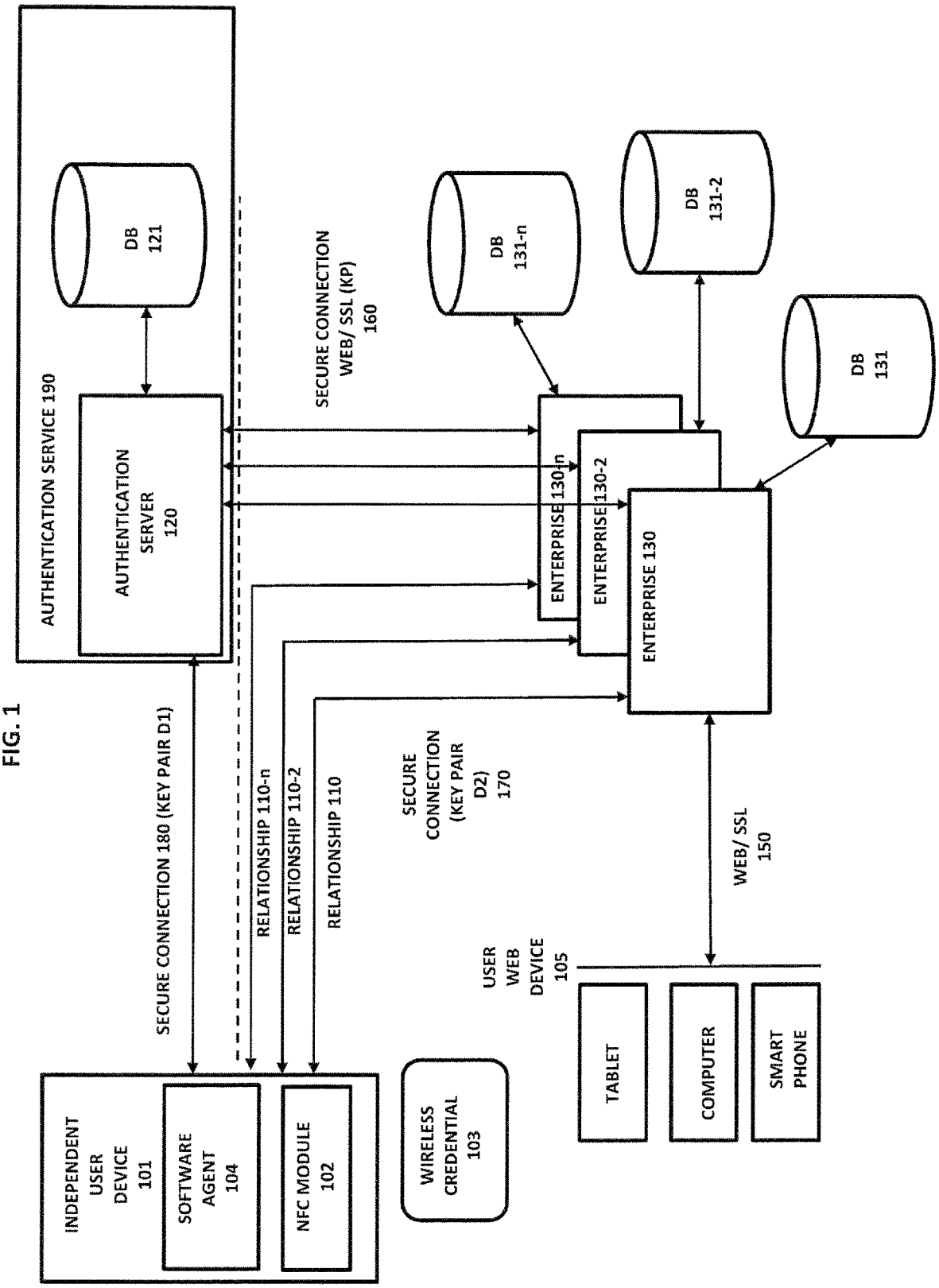
FIG. 1 shows the main components of an authentication system between a user and an enterprise.

Exemplary embodiments will now be described more fully with reference to the accompanying drawings. The exemplary embodiments, however, may be embodied in many different forms and should not be construed as being limited to the embodiments set forth herein; rather, these exemplary embodiments are provided so that this disclosure will be thorough and complete, and will fully convey the concept of the disclosure to those skilled in the art. In the drawings, the size of the various components may be exaggerated for clarity. Like reference numerals in the drawings denote like elements, and thus their description will be omitted.

I. Authentication System Architecture

1. Independent Channel Concept

One aspect of the invention relates to a system which separates these credentials from the identity using an authentication system that anonymizes the transactions used to authenticate a user. The authentication system stores credentials and verifies that the user can present those credentials in a repeated way. The greater the number of identifiers or credentials for a particular user increases the degree of trust that the correct person is being authenticated. For example, if only a password is used the trust is low, whereas if a password, the identity of the user's network device (e.g. smartphone), and a user's biometric (e.g. fingerprint) imaged or otherwise detected by the phone are all used, there is a high level of trust and confidence that the person intended to be authenticated is the person actually authenticated. Thus, even though the authentication system does not know the particular identity of the user, it can provide a high level of confidence that it has authenticated the person associated with a particular set of credentials.

According to this aspect of the present invention, all of the authenticators and devices for a user are aggregated on the authentication server side in an account without the true identity of the user—that is the authenticators and device identifiers are saved anonymously. A particular user may have three different devices and six different authenticators, which are managed in the authentication server to enable authentication of the user. However, to the authentication server the user is simply a person, i.e. a carbon based unit, who provided all of these authenticators, and the authentication server can authenticate that same person through any of the applicable user network devices in the future—without knowing the user's true identity. To accomplish this, four bindings are created: one between the applicable user network device and the authentication service; a second between the user and the authentication service, where the user's authentication credentials are stored; a third binding between a device and its user, as recognized by the authentication service, to an account and identity at an enterprise; and a fourth binding between the enterprise and the authentication service to provide secure access to the user network device and to request user credential verification.

By anonymously aggregating a user's credentials in an authentication service, a person, i.e. a user, now owns his or her credentials. The enterprises, such as banks, can take advantage of them by utilizing the services of the authentication service, but they do not own the user's credentials anymore. The fact that all of this credential information is stored (at the authentication service) separate from the identity information (at the enterprise), provides a privacy and security barrier, and allows centralized management (creation, revocation, renewal, deletion, upgrading) of the credentials. If the user decides to upgrade his device, to one which now for example allows retinal scanning, a new credential can be created at the authentication service once, and that new credential can be utilized by all enterprises using the service. If an attacker hacks into the authentication service, the attacker may gain access to credentials, but does not know which user's identity it is associated with. If an attacker hacks into the enterprise, the attacker can get some identity information, but can get no credentials.

The authentication architecture and the process for developing this system are described with reference to FIGS. 1 and 2. The figures show a process for establishing the secure connections and bindings, with each column identifying an actor, the vertical direction being a sequence in time and the horizontal showing communications between actors.

An important feature in the present authentication system architecture is the concept of breaking authentication from identification and providing multiple secure connections. This is important because it provides for improved privacy and permits anonymizing the transactions. The system is built of three separate and secure communication channel bindings, each binding established between two different entities (the authentication service 190 and the user device 101, the user device 101 and the enterprise 130, and the enterprise 130 and the authentication service 190). These bindings are built on secure connections and configured such that no single compromise of one link, channel or binding compromises the entire system. The design is intended to withstand a break into the authentication service 190, without fully breaking the security model, a break into the enterprise 130 without fully breaking the security model, and a compromise to the user device 101 without fully breaking the security model.

As shown in FIG. 1, the authentication service 190 is capable of communicating with multiple enterprises 130, 130-2 . . . 0.130-*n*. However, for purposes of explanation, this following description is limited to a single enterprise 130. Additionally, the authentication service 190 and each enterprise 130 can have relationships with multiple users. Thus, the system described below may be implemented as a shared service or separately for each enterprise.

In this embodiment, there are three sets of keys, to support three secure connections, one corresponding to each binding. The first is a secure connection between the enterprise customer and the authentication service. In this example, this is a secure connection 160 between a customer (enterprise 130) and the authentication service (authentication server 120). This secure connection 160 could be as simple as SSL or it could be a mutually authenticated connection.

The second secured connection is created between the independent user device 101 and the authentication server 120. This connection may be established through, for example, a mobile device using a downloaded application or software agent 140. The independent user device 101 communicates using a network connection and contains software capable of executing various cryptographic techniques (encryption/decryption). This connection is used to securely communicate to the authentication server 120 to enroll and verify user credentials, such as a password, voice biometric and/or fingerprint, but does require the identity of the user. Thus, the dotted line in FIG. 1 represents a line of privacy. The authentication server 120 does not know the true identity of the user, but knows the user is the same human being who enrolled the credentials. When that enrollment to the authentication service gets created, the binding is establishing between the authentication server 120 and the independent user device 101. An asymmetric key pair D1 (PK1/PK1') is created 211 with one key PK1 stored 215 on the independent user device 101 and the matching key PK1' stored at the authentication service 190. In this embodiment, the key pair D1 (PK1, PK1') is created, but neither of the keys PK1, PK1' are made public—no certificate authority holds one of the keys PK1 or PK1'. This key pair is established between the authentication service 190 and the user device, generated using software at the authentication service.

The third secure connection 170 is established between the user device 101 and the enterprise 130 using the authentication service 190. This connection is secured using a second asymmetric key pair D2 (PK2/PK2') established between the user device 101 and the enterprise 130. This key pair D2 is generated by the user device 101, and one key PK2 is stored on the independent user device, and the matching key PK2' is stored at the enterprise, and associated with the user and the associated device.

Figure 2:
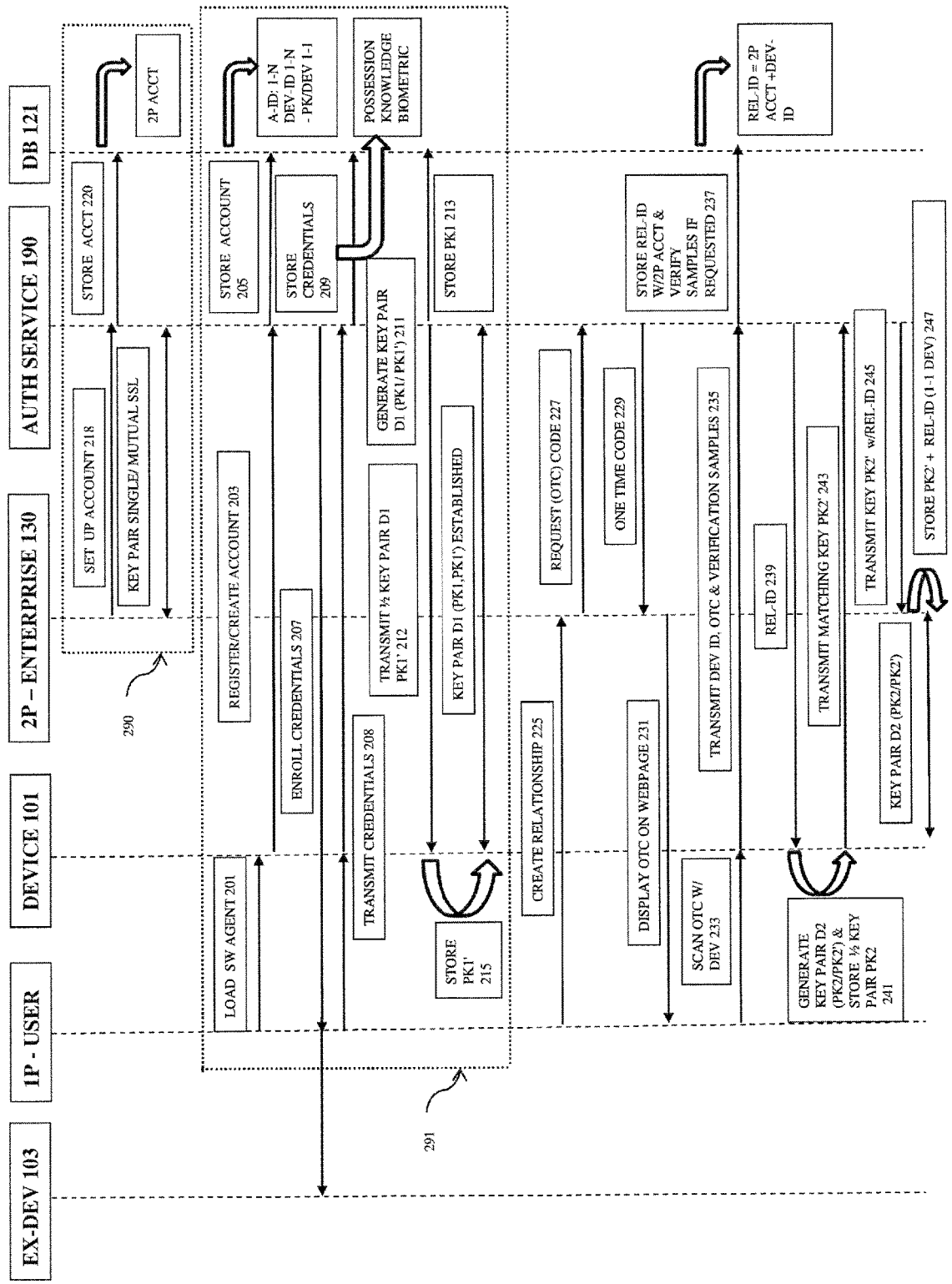
FIG. 2 shows a process for setting up secure relationships within the authentication system.

FIGS. 1-2 show a system and process for establishing and using an authentication system in accord with a first embodiment.

First, the process for establishing a relationship 290 between the enterprise 130 and the authentication service 190 is described, followed by the process for establishing a relationship 291 between the user/user device 101 and the authentication service 190. It is noted that the relationships between the user/user device 101 and the authentication service 190, and the relationship between the enterprise 130 and the authentication service 190 need not be established in the order shown in FIG. 2. That is, the enterprise 130/authentication service 190 relationship 290 may be established before or after the relationship 291 established between the user/user device 101 and the authentication service 190 (as shown in FIG. 2).

The user first downloads 201 a software agent 140 to the user device 101. This software agent may be an app downloaded from an application store or embodied in some other manner. The software agent is provided by the authentication service 190, but may be provided from another source, such as the enterprise. The software agent on the user device 101, creates 211 an asymmetric key pair D1 (PK1/PK1'). One key PK1' is transmitted to 212 and stored 213 at the authentication server (for example in the DB 131), and the matching key PK1 is stored 215 in the user device 101. The user agent also sends other information including a device ID (DEV-ID) to the authentication server 120 to register the device. This device ID identifies the device and the specific downloaded software running on the device to allow the specific device to be addressed and later receive communications from an enterprise. Preferably, this device ID is tightly bound to the specific hardware device. The goal is to create a device ID that is not clone-able and as immutable as possible. The authentication service 190 creates an account ID (A-ID) for the user and stores 205 the account with the device ID corresponding to the user device 101 at the server, for example in the database 121. If this is the first time the user has utilized the authentication service from any device, as part of this device registration process, the authentication service 190 also requests that the user enroll credentials 207. The credentials are used for authentication of the human being (not the device) and may include, biometric authenticators (B) (for example, fingerprint, voice, facial recognition), possession authenticators (P) (for example, mobile phone, NFC smart card, Bluetooth device) and knowledge based authenticators (K) (for example, passwords, patterns, social security number). These credentials are collected though the device 101 and the user can select which credentials to enroll based on the device capabilities and the user's preference. For example, the user may provide a fingerprint sample, voice sample or facial recognition sample by collecting these credentials using the device 101. These credential samples are then transmitted to 208 back to the authentication service 190 and stored 209 in association with the account ID.

In some instances, the user device 101 may not be configured to transmit certain credentials to the authentication service 190. For example, a smartphone may be configured to sample a fingerprint and verify that this fingerprint belongs to the user of the smart phone, but in view of security concerns, the smartphone may not transmit the fingerprint attributes. In this instance, the credential relating to the fingerprint biometric may merely be stored in a manner to indicate that user device 101 is capable of obtaining and verifying a fingerprint sample. When verifying the user credential of the fingerprint during an authentication process the user device 101 with would then just transmit a message indicating, "fingerprint verified", back to the authentication service 190. This message would preferably be timestamped and digitally signed be a device key (such as PK1) to avoid replay attacks.

Next, the establishment of a relationship between the enterprise 130 and the authentication service 190 is described. The exact nature of the relationship establishment is not directly pertinent to this invention. What is important is the authentication service 190 sets up an account and stores 220 an account ID (2P ACCT) for each enterprise 130 in a way that the authentication service can ensure secure communications to and from the enterprise, and it can verify the enterprise account when receiving communications over the secure communications channel. For example, server side SSL or mutually authenticated SSL can be utilized between enterprise 130 and the authentication service 190 to implement such a secured channel.

Establishment of the third relationship, the relationship between the user/user device 101 and the enterprise 130, is described. One example of how such a relationship is established is the user goes to the enterprise 130 website to perform a transaction. The enterprise having a relationship with the authentication service, may inquire whether the user wishes to use the authentication service 190, or may require that the user use the authentication service 190 to perform certain transactions. The user then indicates the desire to create a relationship 225 with the enterprise 130 using the authentication service 190. At this point, it is not clear to the enterprise 130 whether the user has a relationship with the authentication service 190. Consequently, the enterprise 130 may query the user to determine if they have a device setup with the software agent. If not, the enterprise 130 can direct the user to establish a relationship using the relationship process 291

Prior to setting up a relationship with the user via the authentication service, it is important that the enterprise have confidence that the user meets the enterprises requirements for identity. The authentication service will verify it is the same human being, and the enterprise must verify the human matches their stored identity. It is left up to the enterprise to perform whatever due diligence is necessary, either at this point=immediately prior to the authentication service verifying the human, or immediately after.

When it is established that user has a device 101 setup with the software agent and intends to establish a relationship with the enterprise 130, the enterprise 130 queries the authentication service 190 for some type of one-time code (OTC) 227. As a part of this query, the enterprise can optionally specify which authentication credentials it requires the authentication service to utilize to authenticate the user. The method the enterprise uses to specify which credentials must be used can be at any level of credential specification (category, type, attribute, or any combination). If the enterprise specification is not distinct, the authentication service will provide any missing details to distinctly determine the credential to utilize, based on the authentications service's knowledge of what the device is capable of and which credentials the authentication service believes are best.

The authentication service 190 then generates the one-time code, which is typically globally unique number, and transmits 229 the one-time code 227 to the enterprise 130. The enterprise 130 receives the one-time code and provides it to the user 231 through its website or some other method. For example, the one-time code may be sent via SMS to the user or displayed on the webpage of the enterprise to be seen by the user. The one-time code may be sent or displayed as a user readable code, such as a number, to be entered by the user into the device 101, or sent or displayed as a device readable code (such as a QR code) to be captured via a camera or scanner within the device 101. To optionally authenticate the user who is inputting the OTC, the software agent on the device can perform authentication of the user based on the authentication credentials selected by the enterprise as part of the OTC query. These optional authentication samples, possible local authentication verification results, along with the OTC and the DEV-ID are then sent 235 by the software agent on the user device 101 over the secure channel 180 to the authentication server where the authentication service can verify the user and determine which enterprise requested this specific OTC. The purpose of this process is to have some sort of OTC associated with one enterprise, be input into the user device 101, in conjunction with optional user authentication, to provide a method to link the user and the device 101 to the enterprise 130.

Once this link is established, the authentication service 190 generates and stores 237 a relationship ID (REL-ID) that associates the device ID and user account (A-ID) of the user device 101 with the account ID (2P ACCT) of the enterprise 130. The authentication service 190 then pushes the relationship ID 239 to the device 101 through the secure connection 180. The user device 101, using the software agent, generates an asymmetric key pair D2 (PK2, PK2'), stores one key (PK2) 241, and transmits the other key (PK2') 243 over the secure connection 180 to the authentication service 190. The authentication service 190 does not store the other key PK2', but transmits 245 PK2' with the relationship ID (REL-ID) to the enterprise 130 over the secure connection 160. The enterprise 130 stores 247 the key PK2' with the relationship ID (REL-ID). This will be used to decrypt encrypted messages sent by the user device 101—decrypt [encrypt [message] PK2] PK2'. This key pair enables the user device 101 and the enterprise 130 to send and receive encrypted messages between one another without permitting the authentication service 190 to decrypt these messages, thus providing enhanced security.

Once this secure communications channel 170 is established between the device and the enterprise, this is a second opportunity for the enterprise to verify the user's identity prior to trusting the relationship ID is truly bound to its user identity. If part of the identity information the enterprise can utilize for identity verification is of type possession, such as a wireless readable credential, the enterprise can attempt to read that credential while this device—enterprise secure connection 170 is established. To accomplish this, the enterprise can send a request to the authentication service over communications channel 160 to read a wireless credential via device 101, along with an encrypted message over secure communications channel 170 to be displayed on device 101, asking the user to present their credential so the device can read it. The software agent can utilize whatever wireless communications capabilities the device has to offer to read the wireless credential in the possession of the user, and transmit the contents of such credential back to the enterprise over the secure communications channel 170. The enterprise can then verify the content is as expected from its identity information, which then provides the enterprise more trust that the relationship ID truly matches the identity.

Thus, three secure connections are established. One secure connection is established between the user device 101 and the authentication service 190 over secure connection 180 using key pair D1. Another secure connection is established between enterprise 130 and the authentication service 190 over secure connection 160 using single or mutual SSL. The third secure connection is established between user device 101 and enterprise 130 over secure connection 170 using a key pair D2.

While the security established between the different channels is described using key pairs above, it is noted that different methods of providing secure channels may be used, those different methods providing secure communications may have a greater degree or lesser degree of security than the secure connections described above.

2. Separation of Identity and Privacy

Another aspect of this embodiment is the separation of authentication credentials and identity. If the identity and the credentials of a user are stolen, it is easy to emulate the user. By contrast, a user's credentials have virtually no value without the identity of the user. The dotted line in FIG. 1 represents this separation. The authentication service 190 knows the independent user device 101 via a device ID and it enrolls and stores the user credentials used to verify the user, but does not know the true identity of the person enrolling those credentials. The authentication service 190 associates those credentials with an account ID (A-ID) for the user associated with the user device 101. On the other hand, while the enterprise 130 is aware of who the user identity is, because they use the authentication service 190 to verify the user's credentials, the enterprise 120 is separated from the credentials used to verity the user.

In this system, to provide for enhanced security, the authentication service 190 does not have knowledge of a user's true identity. Instead, the authentication service 190 verifies the user based on enrolled credentials—without having any identity of the user. The authentication service 190 stores the user's credentials (for example in database 121) and verifies that the user can present those credentials in a repeated way. So, the more accurate the credentials or the greater the number of enrolled credentials provides a higher degree of trust that the user is the same person coming back through the device 101. For example, if the authentication service is just checking the password the trust is low. If the authentication service checks a password and it is received from a specific user device, the user has swiped a specific pattern on the screen and the user presents a fingerprint sample via the device—the trust is relatively high. If additional authenticators are added, such as new uses for NFC enabled devices, the result is a greater degree of trust that the real user is being authenticated.

So the authentication service 190 aggregates all of the authenticating credentials with an account ID (A-ID), and any number of corresponding user devices 101 via device IDs (DEV-ID). So, without having the user's true identity the authentication service 190 can verify a user, to a very accurate degree, is the same human being as was initially registered, utilizing any number of known devices.

3. Relationships and IDs

As noted above, in order to maintain anonymity of the user while permitting the user to engage with an enterprise and use the authentication service 190, multiple relationships are established. A relationship is established between the enterprise 130 and the authentication service 190 and stored as an account (2P ACCT-ID). Here, the identity of the enterprise 130 and the authentication service 190 is known. Another relationship is established between the user and the authentication service 190 and is stored as an account ID (A-ID). Another relationship is established between a user device 101 and the authentication service 190 and this is identified using a device ID (DEV-ID). This identifier (DEV-ID) also identifies the specific user device 101. In this instance, the authentication service 190 is not aware of the user's identification. Instead, the account ID (A-ID) is associated with a set of enrolled credentials, and one or more device IDs (DEV-ID). Finally, a relationship is established between the user device 101 and one or more enterprises 130-130-*n* as relationship IDs (REL-ID).

The account ID between the enterprise 130 in the authentication service 190 (2P ACCT-ID) is stored in the database 121 or similar persistent storage at the authentication service 190.

The account ID (A-ID) identifying the account between the user and the authentication service 190 is stored in the database 121 or similar persistent storage at the authentication service 190. This account ID (A-ID) is associated with one or more device IDs (DEV-ID,) and one or more enrolled credentials (fingerprints, NFC card content, voice attributes, passwords, patterns, etc).

A relationship ID (REL-ID) is stored in the authentication service 190 database 121 or similar persistent storage and associated with one account ID (2P ACCT-ID that identifies the account between the enterprise 130 and the authentication service 190), and one device ID (DEV-ID). The relationship ID (REL-ID) is also stored at the enterprise 130 associated with the enterprise user identity. Consequently, when the enterprise 130 is performing transactions with a user, the enterprise 130 can verify the user through the authentication service 190 credential and device verification, without relying on the user's true identity to be known by the authentication service 190. Rather, the enterprise 130 identifies the user to be authenticated using the relationship ID (REL-ID). The authentication service 190 uses the relationship ID (REL-ID) to identify the device ID (DEV-ID), which can be used to locate the account ID (A-ID) and associated user credentials, which can be verified by the authentication service 190. The establishment of these relationships enables the authentication service 190 to communicate with the user's device 101 and verify the user's credentials without knowing the true identity of the user. From a security aspect, the device information and the user credentials are segregated from the true identity of the user.

4. Secure Communications

Another important aspect of this embodiment relates to secure/encrypted communications between the parties. In this embodiment, asymmetric keys, such as PKI cryptographic keys and/or SSL are used to encrypt messages to secure communications between the various actors. As noted previously, these relationships are built on secure connections such that no one party of the three channels of communications has all the keys.

As shown in FIG. 1, there are three sets of secure connections, one corresponding to each relationship. The first is a secure connection between the customer and the authentication service. In this example, this is a secure connection 160 between a customer (enterprise 130) and the authentication service (authentication server 120). This secure connection 160 could be as simple as SSL or these communications could be encrypted using mutual key pairs.

The second secured connection is created between the independent user device 101 and the authentication server 120. In this embodiment, the user uses the user device 101 to set up an account with the authentication service using a software agent 140 downloaded to user device 101. To set up this connection, the authentication server 120 requires some credentials, such as a password, voice biometric and/or fingerprint, but does require the identity of the user. The authentication service 190 generates an asymmetric key pair D1 (PK1/PK1'), stores 215 one key (PK1) of the key pair in the device 101 and transmits the matching key (PK1') to the authentication service 190 which stores the key in association with the account ID (A-ID). Future communications between the authentication service 190 and the user device 101 can be encrypted using the one of the keys and decrypted using the matching key.

The third secure connection is between the enterprise 130 and the end user device 101. To establish this connection, a one-time code is obtained by the enterprise, and in some way (like SMS or email or presenting on a web page) communicated to the user and entered into the device 101 or captured directly be the device 101 (e.g via a camera). After the one-time code is inputted into the device 101 an identifier, the device ID, is transmitted 235 to the authentication service 190 with the one-time code. In response to receiving the device ID and the one-time code, the authentication service 190 generates and stores 237 a relationship ID (REL-ID) that associates the device ID of the user device 101 with the account ID (2P ACCT) of the enterprise 130 whose one-time code was inputted into that device. The authentication service 190 then pushes the relationship ID 239 to the device 101 through the secure connection 180. The user device 101, using the software agent, generates another asymmetric key pair D2, stores one of the keys (PK2) 241, and transmits 243 the matching key (PK2') over the secure connection 180 to the authentication service 190. The authentication service 190 does not store the key PK2', but transmits 245 the key PK2' with the relationship ID (REL-ID) to the enterprise 130 over the secure connection 160. The enterprise 130 stores 247 the key PK2' with the relationship ID (REL-ID). Thus, three secure connections are established with the ability to encrypt/decrypt messages sent between any two of the parties.

5. Transacting Using the Authentication Service

Figure 3:
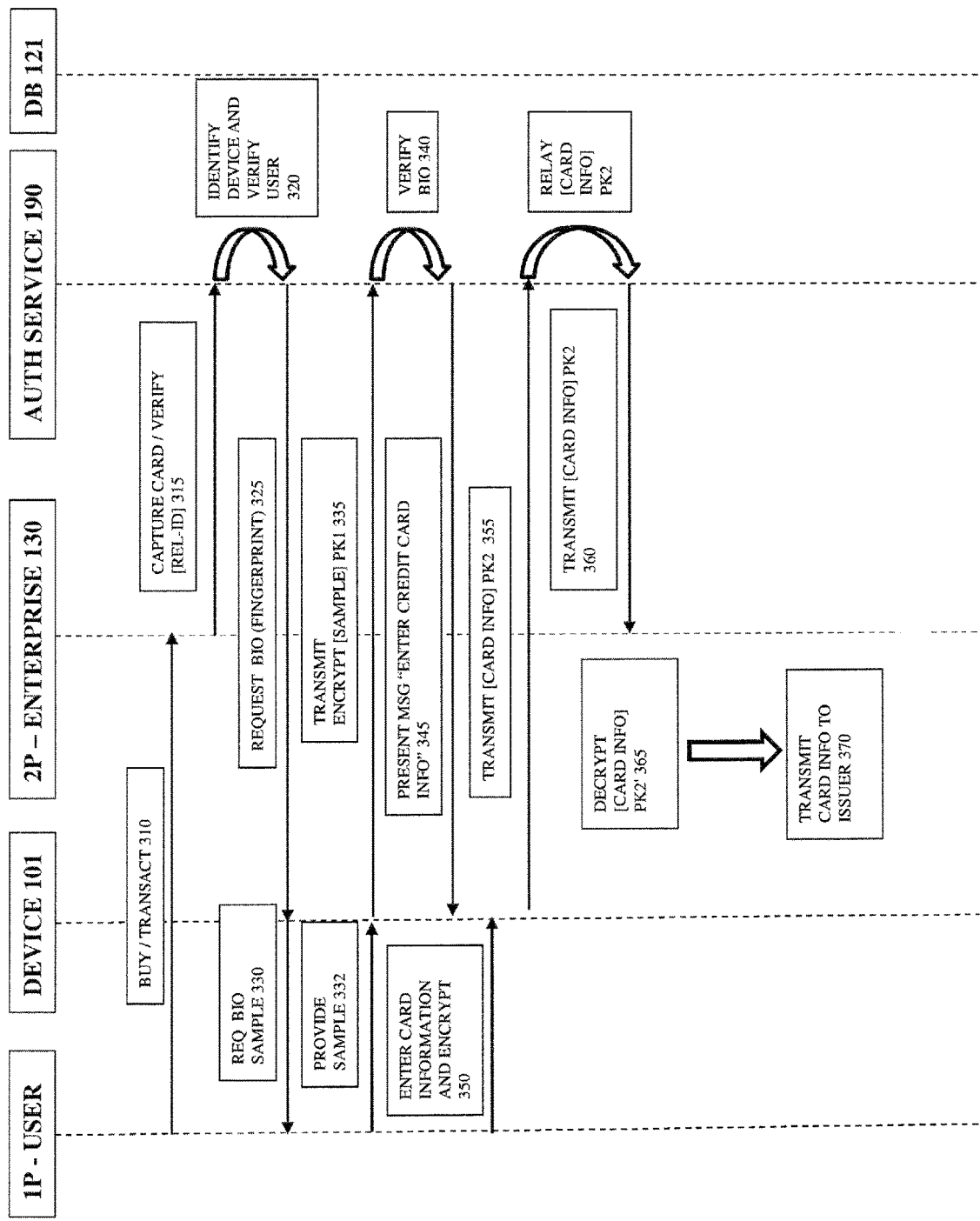
FIG. 3 shows a process of a user conducting a transaction with an enterprise using the authentication system of FIG. 1.

FIG. 3 shows an example transaction between a user and the enterprise, exemplifying how the authentication service 190, the user and the enterprise 130 interact without the authentication service 190 knowing the user's identity. This transaction also exemplifies how the information may be exchanged in an encrypted form between the user device 101 and the enterprise 130 without permitting the authentication service 190 access to the exchanged information.

Initially, the user engages the enterprise 130 to make a purchase or perform some transaction with the enterprise 130. In this case, for purposes of explanation, the user is going to make a purchase 310 using the user's credit card. The enterprise 130, in order to verify that the user is who he/she alleges to be, sends a request to the authentication service 190 to capture the credit card information and to verify the user. As a part of this request the enterprise can attach a message to the user encrypted using PK2' of the key pair specific to the relationship ID (REL-ID). Also as a part of this request, the enterprise can optionally specify which authentication credentials it requires the authentication service to utilize to authenticate the user. The method the enterprise uses to specify which credentials must be used, can be at any level of credential specification (category, type, attribute, or any combination). If the enterprise specification is not distinct, the authentication service will provide any missing details to distinctly determine the credential to utilize, based on the authentications service's knowledge of what the device is capable of and which credentials the authentication service believes are best. The request includes the relationship ID (REL-ID). Using the relationship ID, the authentication service 190 identifies the device ID (DEV-ID) as well as the user's specific set of credentials, and sends a command to the device 101 in order to verify the user and capture the card information. While the authentication service 190 is capable of using any of the credentials enrolled by the user through the user device 101, in this example the authentication service 190 sends a command to the device 101 requesting a fingerprint sample 325. A message is then displayed on the user device 101 requesting a fingerprint sample 330. After the user provides the sample, for example, by placing a finger on the device sensor 332, the sample is encrypted using PK1 of the key pair D1 and this encrypted sample is transmitted 335 back to the authentication service 190, which decrypts the sample using PK1'. As noted above, in the event that the user device 101 is not configured to send the sample, but instead, performs its own verification of the sample, a result of the verification would be encrypted and transmitted back to the authentication service 190.

Here we are assuming that a sample is provided to the authentication service 190. After receiving the sample, the authentication service 190 verifies the sample 340. After the sample has been positively verified, the authentication service 190 transmits a command to the device 101 to request data entry. The device decrypts the message sent from the enterprise, in this case "ENTER CREDIT CARD INFORMATION" 345. The user then enters the credit card information 350 into the user device 101. User device 101 encrypts the credit card information using key PK2 of key pair D2 shown as [CARD INFO] PK2 and transmits 335 this information to the authentication service 190. The authentication service 190 then transmits the encrypted information to the enterprise 130 which holds the key PK2' to decrypt the credit card information. The enterprise decrypts the credit card information [CARD INFO] PK2' 365 and sends it on to the credit card issuer for processing 370.

In operation, capturing the credit card information only after verifying the credentials of the user, including biometrics, binds the user, the card and the device together in essentially real-time, to ensure the card is actually being presented by the owner, instead of being stolen. The system layers the capture of data with a set of simultaneous and in proximity, authentication. For security purposes, it's important that it has to be in the same spot, at the same time, and the human is verified before you get the information. The authentication service 190 will not take the information unless you can verify that you are who the card issuer expected you to be by presenting verifiable credentials. Another aspect of this system is that the authentication service 190 is passing encrypted information that it cannot decrypt because it does not hold the required key. This protects the user and the enterprise from not only a privacy perspective, but also from a security perspective as the authentication service 190 does not hold the keys D2.

II. Wireless Information Capture and User Credential Verification

Another aspect of the present application is described with regard to the use of wireless technology, like the near field communications (NFC) module 102 of the user device 101 in conjunction with a wireless credential 103 as shown in FIG. 1. To provide for increased security and convenience, it is becoming more common for banks, etc., to issue NFC enabled credit cards (smart cards), or other wireless tokens or tags. While this embodiment is described with reference to using near field communications and NFC module 102, any low energy wireless communication, such as Bluetooth Low Energy (BLE) devices may also be utilized. In effect, these cards are readable when placed in close proximity to a reader (point of sale terminal, etc.) So, instead of physically entering account information or reading it from a magnetic strip, you tap the card on a capable device and it is read wirelessly. Because these cards, tags or tokens can be intelligent and dynamically generate data (for example, digitally sign challenge value) which are not easily reproducible or copied, and because they must be in proximity to the reader, they provide a possession credential for verifying a user, entry of information wirelessly to eliminate errors, ease of use, and better security. However, since these cards can be stolen, higher security requires that the user (holder) of the card also be verified at the same time as the presentation of the card, and authenticated as the user whom the card was issued to.

Smart phones are now being developed with both wireless credential reader and emulator capabilities. Apps within your phone can emulate a wireless enabled credit card. It is now possible to tap your phone to a POS terminal and the terminal will read the phone as if it is reading a credit card wirelessly. This is known as hardware card emulation HCE. Additionally, smart phones are now available with the ability to read wireless tags or tokens (e.g. smartcards, etc.). In this embodiment, the user is verified using one type of credential, biometric, password, etc., and then after verification, the user is instructed to tap the card to the user device, the device captures the information (which itself is encrypted), which is ultimately delivered back to the enterprise for their use. The benefit of the wireless card/token is that these are unique devices that cannot be easily compromised by hackers, they require possession and proximity. That is, a user must have the actual card in their possession, and also in close proximity to the user device. The card can also provide the issuer's account information in encrypted form so that neither the user device 101 nor the enterprise 130 can view this information—they just pass it to the issuer for confirmation. Rather, in contrast to standard credit card information in which the credit card need not be present, and the credit card account information is not encrypted on the card. The use of a wireless card can provide verification (possession) as well as additional security through its own encrypted data. The synergic effect for authentication is that the user is using their own card/token on their own user device 101. This authentication provides a higher level of trust because both of these authenticators (card and user device) are non-reproducible and likely to be reported when lost or stolen.

Figure 4:
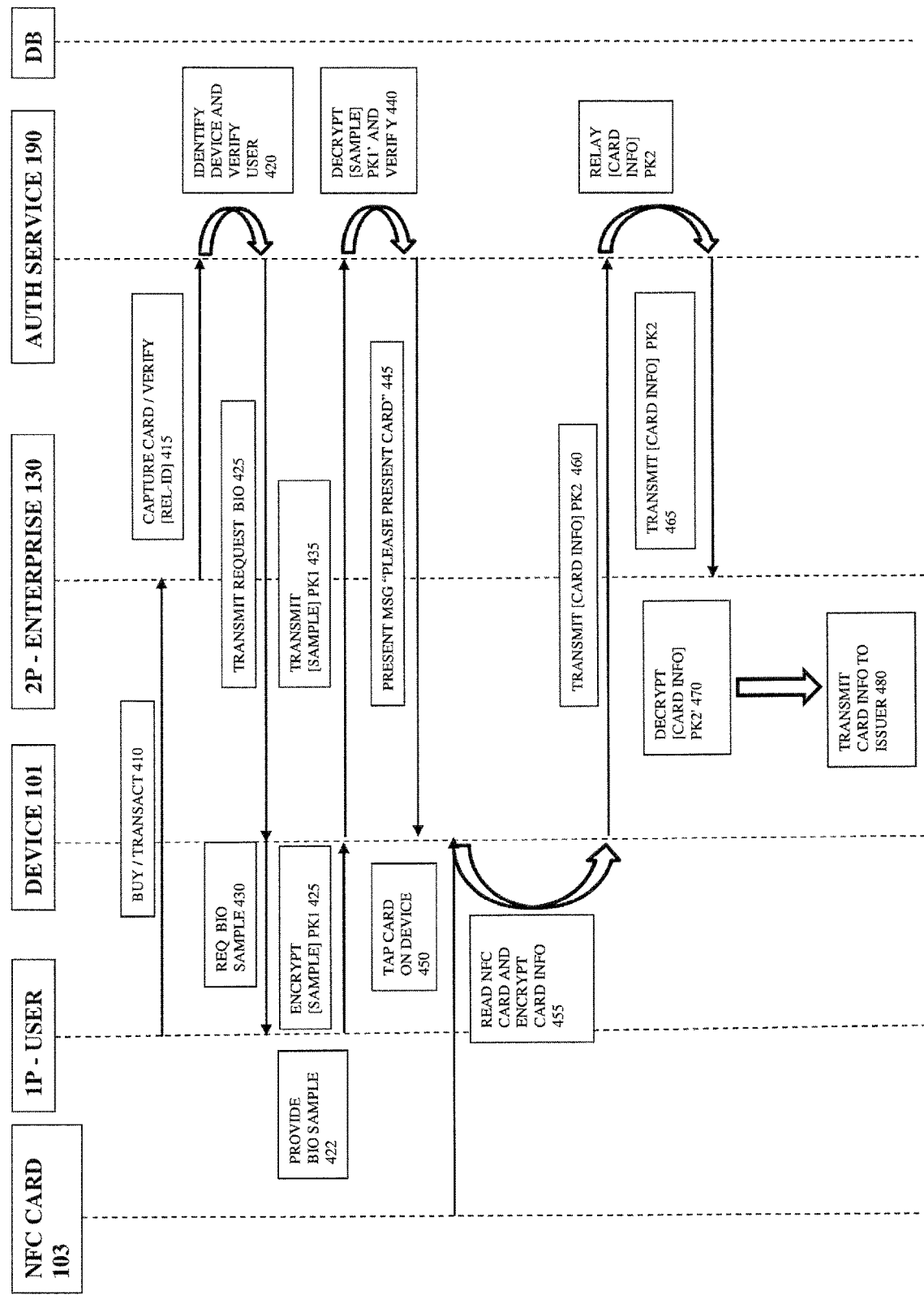
FIG. 4 shows a process of a user conducting a transaction with an enterprise using the authentication system in combination with a wireless credential.

FIG. 4 shows an example transaction between a user and the enterprise exemplifying the use of wireless credential enabled devices and smartcards to pass through account information in encrypted form.

Initially, user engages the enterprise 130 to make a purchase or perform some transaction with the enterprise 130. In this case, for purposes of explanation, the user is going to make a purchase 310 using the user's wireless credential, which is a wireless card 103 (for example, an NFC enabled credit card—but may be some other secure token). The enterprise 130, in order to verify user that the user is who he/she alleges to be, sends a request to the authentication service 190 to capture the credit card information (wireless card 103 information) and to verify the user prior to collecting the card information.

The request from the enterprise 130 includes the relationship ID (REL-ID), but may also include information from the enterprise 130 informing the authentication service 190 how to read the card/token (e.g., manufacturer's data, index data, PPSE data). As a part of this request the enterprise can attach a message to the user encrypted using PK2' of the key pair specific to the relationship ID (REL-ID). Also as a part of this request, the enterprise can optionally specify which authentication credentials it requires the authentication service to utilize to authenticate the user. The method the enterprise uses to specify which credentials must be used can be at any level of credential specification (category, type, attribute, or any combination). If the enterprise specification is not distinct, the authentication service will provide any missing details to distinctly determine the credential to utilize, based on the authentications service's knowledge of what the device is capable of and which credentials the authentication service believes are best.

Using the relationship ID, the authentication service 190 identifies the device ID (DEV-ID) and sends a command to the device 101 in order to verify the user and capture the credit card information. While the authentication service 190 is capable of using any of the credentials enrolled by the user through the user device 101, in this example, the authentication service 190 sends a command to the device 101 requesting a biometric sample 425. A message is then displayed on the user device 101 requesting a fingerprint sample 430. After the user provides the sample, for example, by placing a finger on the device sensor 422, the sample is encrypted using PK1 (shown as encrypt [sample] PK1) 425 and transmitted 435 back to the authentication service 190.

After receiving the sample, the authentication service 190 decrypts (decrypts [sample] PK1') and verifies the sample 440. After the sample has been positively verified, the authentication service 190 transmits a command to the device 101 to request wireless data capture. The device decrypts the message sent from the enterprise, in this case "PLEASE PRESENT CARD" 445, which may also include information informing the user device 101 on how to read the wireless card 103. The user then taps or locates in close proximity 450 the wireless card 103 to the user device 101. User device 101 reads and encrypts 455 the read information using key PK2 from key pair D2 shown as [CARD INFO] PK2 and transmits 460 this information to the authentication service 190. It is also noted that the account information on wireless card may be encrypted so that only the issuing authority can decrypt this information—providing an additional layer of security. The authentication service 190 then transmits 465 the wireless card 103 card information to the enterprise 130 which holds a key PK2' to decrypt the card information. The enterprise then decrypts the card information [CARD INFO] PK2' 470. The card information read from the wireless card 103 may also be in encrypted form such that only the issuer of the card 103 can further decrypt this information. This encrypted account information may then be transmitted to the issuer who decrypts the information to complete the transaction.

As compared to merely entering credit card information on the user device 101, the use of a wireless card 103 requires a uniquely issued card to be present and in proximity to the trusted user device 101 and only after biometrically authenticating the user. As the account information may be encrypted as well by the issuer, an additional layer of security is added in combination with increased trust of the corresponding verification.

III. WireLess Card Challenge

Another unique feature associated with a wireless enabled card is that the card possesses an intelligent chip that can be configured, in conjunction with the issuer, to have one key PK (nfc) of an asymmetric key pair (PK(nfc)/PK'(nfc)). The issuer has the other key PK'(nfc). Thus, the wireless card 103 can encrypt information. Accordingly, to add another layer of security/verification, instead of just reading the card, the card may be challenged with a value (usually random to avoid replay attacks), and the card encrypts the value with the key PK(nfc) and the encrypted value gets sent back to the issuer 135 with the challenge value. The bank (or issuer) then decrypts and verifies the challenge value, which verifies the card is truly the issued card, and provides an additional layer of security from copying or cloning a wireless smart card.

FIG. 5 shows an example transaction between a user and the enterprise exemplifying the use of wireless enabled devices and smartcards to pass through account information in encrypted form.

Initially, user engages the enterprise 130 to make a purchase or perform some transaction with the enterprise 130. In this case, for purposes of explanation, the user is going to make a purchase 510 using the user's wireless card 103 (e.g., NFC enabled credit card). The enterprise 130, in order to verify user that the user is who he/she alleges to be, sends a request to the authentication service 190 to capture the credit card information and to verify the user prior to collecting the card information. However, in this embodiment, the enterprise 130 also generates a random number (123) or a globally unique number as a challenge value, encrypts the random number [challenge value] PK2' and transmits 515 this number to the authentication service 190 with a challenge request to forward to the user device 101 after the user's credentials are verified. The request includes the relationship ID (REL-ID)), but may also include information from the enterprise 130 informing the authentication service 190 how to read the card (e.g., manufacturer's data, index data, PPSE data). As a part of this request, the enterprise can attach a message to the user encrypted using PK2' of the key pair specific to the relationship ID (REL-ID). Also as a part of this request, the enterprise can optionally specify which authentication credentials it requires the authentication service to utilize to authenticate the user. The method the enterprise uses to specify which credentials must be used can be at any level of credential specification (category, type, attribute, or any combination). If the enterprise specification is not distinct, the authentication service will provide any missing details to distinctly determine the credential to utilize, based on the authentications service's knowledge of what the device is capable of and which credentials the authentication service believes are best. Using the relationship ID, the authentication service 190 identifies 520 the device ID (DEV-ID) as well as the user's specific set of credentials, and sends a command to the device 101 in order to verify the user. While the authentication service 190 is capable of using any of the credentials enrolled by the user through the user device 101, in this example the authentication service 190 sends a command to the device 101 requesting a biometric sample 525. A message is then displayed on the user device 101 requesting, for example, a fingerprint sample 530. After the user provides the sample by placing a finger on the device sensor 532, the sample is encrypted using a key of the key pair D1 PK1 (encrypt [sample] PK1) 534 and transmitted 535 back to the authentication service 190.

After receiving the sample, the authentication service 190 decrypts the sample using the other key of the key pair D1 (decrypts [sample] PK1') and verifies the sample 540. After the sample has been positively verified, the authentication service 190 transmits a command to the device 101 to request wireless data capture with a challenge. The device decrypts the message sent from the enterprise, in this case "PLEASE PRESENT CARD" 545 with a request to challenge the card with the challenge value from the enterprise request. The user device 101 decrypts the encrypted challenge value using key PK2 of the key pair D2—decrypt [challenge value] PK2. The user then taps 550 the wireless card 103 on the enabled user device 101. The information on the wireless card 103 is read and the wireless card 103 is challenged using the value. The card 103 encrypts the challenge value using an embedded key PK(nfc) and transmits this to the user device 101. User device 101 reads and encrypts 555 the read information including the encrypted challenged value using key PK2 of key pair D2 (encrypt [CARD INFO+[challenge value] PK(nfc)] PK2. The user device 101 then transmits all of this information to the authentication service 190. The authentication service 190 then transmits/relays 562 the encrypted wireless card 103 information and the encrypted challenge value to the enterprise 130 which holds a key PK2' of key pair D2 to decrypt the credit card information. The enterprise decrypts the information (decrypt [CARD INFO+[challenge value] PK(nfc)] PK2') 570. The card information read from the wireless card 103 may also be in an encrypted form such that only the issuer of the card 103 can decrypt this information. Next, the encrypted challenge value and the challenge value generated by the enterprise 130 are transmitted to the issuer 135. The issuer can then decrypt the challenge value (decrypt [challenge value] PK'(nfc)) and verify 580 it is the same challenge value transmitted from the enterprise 130. If the decrypted challenge value is verified by comparison to the challenge value transmitted from the enterprise 130, the issuer 135 transmits the result back to the enterprise 585 as further verification that the system has not been compromised. In response, the enterprise 130 transmits 590 the card information back to the bank 135 or issuer of the card.

As compared to merely entering credit card information on the user device 101, the use of a wireless card 103 requires a uniquely issued card to be present, in proximity to the trusted user device 101, and only after biometrically authenticating the user. As the account information may be encrypted as well by the issuer, an additional layer of security is added. The addition of using a card challenge provides an additional level of security as the random number is generated for each particular transaction providing for an additional layer of security against replay attacks.

IV. Smart Choice

Another aspect of the present application is to provide an authentication service with all available authenticators for a particular user network device (e.g. a user's smartphone or IPad' or laptop computer, etc.) integrated. In doing so, all these authenticators are now available to the authentication service for use as parameters to anonymously authenticate the user associated with that device for any enterprise with which the user has established a relationship. To do so, the authentication service initially sets up a relationship with the applicable user network device binding all of the authenticators available on that device to the authentication server. Thus, the enterprise need not know what authenticators are available on a user's device. Instead, the enterprise can simply ask the authentication service for a biometric credential, a knowledge credential and/or a possession credential. The authentication server will then determine what credential(s) are available from the user's network device in each desired credential category and request the most appropriate available credential(s) from the use's device for the desired category. For example, if the user is performing a high level (e.g. high US dollar amount) transaction, the enterprise may want a biometric credential, along with a knowledge credential such as a password, to be verified. The authentication server knows which biometrics are available on the user device and queries the user for a biometric available on the device. If multiple biometrics are available on the device, the authentication server selects the biometric considered most appropriate under the circumstances prior to making the query, and requests the selected biometric.

In any of the transactions and interaction described in the embodiments above, the enterprise 130 can specify the category of credential to be verified by the authentication service 190. However, to do so, the enterprise must have specific knowledge of what credentials the user has enrolled using the user device 101. The credentials are may also be directly associated with the account ID (A-ID) of the user, or associated with the account ID (A-ID) via the particular device ID (DEV-ID) the credential is associated with. All of the user's devices are associated with the account ID (A-ID).

Another aspect is to provide a choice option when the enterprise 130 is dealing with a particular device in which the enterprise selects the policy at a category level (biometric, knowledge or possession) and the authentication service chooses the best or the available type (fingerprint, voice, facial recognition—in the case of biometric) to use. Thus, the enterprise need not know all of the available types of biometrics available, but can merely select biometric. Another aspect provides that the enterprise can query the authentication service about which authenticators are available and the authentication service can respond with categories, types and attribute available.

Another aspect, in the case where a user has multiple devices enrolled, after receiving a query or a policy request from the enterprise, the authentication service can let the enterprise know what authenticators are available based on the various user devices that have relationships established with the enterprise. As the relationship between a particular device and the enterprise is device specific, in the case of multiple devices, the enterprise and the user may have multiple relationship IDs (REL-ID) set up. These are separate and distinct as each relationship will have a different asymmetric key pair corresponding to each user device.

FIG. 6 shows a table representing a hierarchical list of available credentials including categories, types and attributes stored in the database 121 of the authentication service 190 to be associated with a particular account ID for an enrolled user. As shown in the table, the categories include biometric, knowledge and possession—however, the present invention is not limited to this particular hierarchical structure. Each one of these categories may contain several types of credentials, for example, the biometric category one type is finger, which relies on captured aspects of the user's finger. At a finer level of detail, each type may be identified by an attribute. For example, with regard to the fingerprint, the attribute may be which finger=index.

In some instances, a user may have an account set up with more than one user device. Because each user device may have different capabilities for obtaining various credentials, the table may be set up to identify which devices are capable of sampling which credentials. However, the device capabilities may be stored separately from the list of enrolled credentials.

Figure 7:
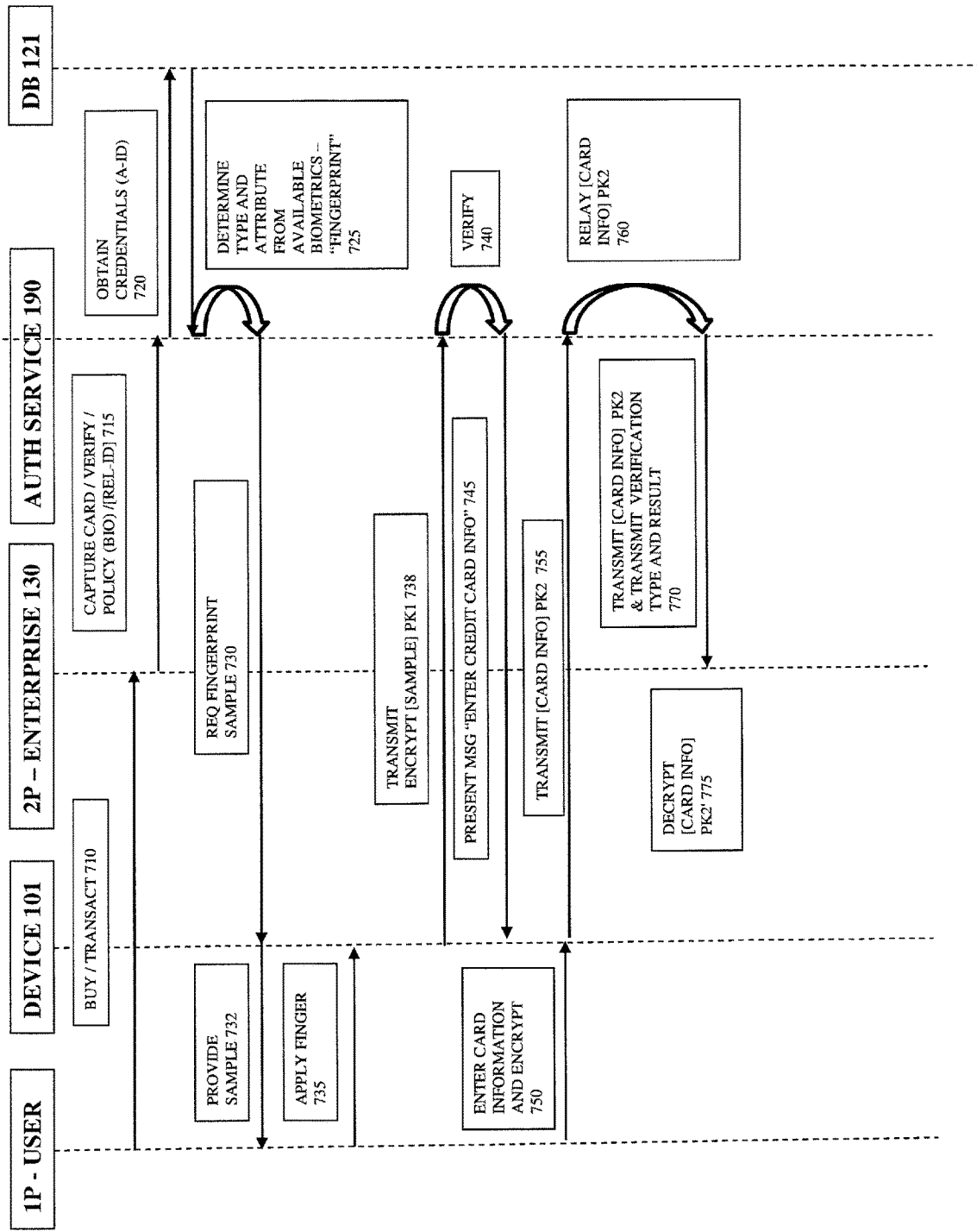
FIG. 7 shows a process for selecting authenticators/credentials for verification based on a policy set by the enterprise.

FIG. 7 shows a process where the enterprise 130 establishes a policy for verification and the authentication service 190 reviews the policy and selects the applicable credential for verification. This process incorporates the relationships and key pairs established in FIG. 2. In this example, the policy is applied to the user's enrolled credentials where the user only has a single device enrolled with the authentication service 190. The process begins when the user engages the enterprise 130 to perform some transaction. In this case, the user is making a purchase 710 from the enterprise 130. To complete the purchase, the enterprise 130 sends a request 715 to the authentication service 190 to verify the user prior to capturing the account information from the user's credit card. This request also includes a policy request regarding the verification of the user. In this example, assume the transaction is for a substantially high purchase amount. Rather than elect to receive a mere password from the user, the enterprise 130 can set the policy to require a biometric from the user. In order to determine what credential to require, the authentication service 190 accesses the enrolled credentials in the database 121. Again, assume the user has only enrolled one device (DEV 1). While the enterprise 130 set the policy at the category level, this is not required. Rather, the enterprise 130 may set the policy at a finer granular level by selecting a specific type and a specific attribute.

With reference to table 1, the enrolled user device is capable of two types of biometrics—voice and finger. Thus, there are two types of biometrics available for selection by the authentication service 190. The authentication service 190 then chooses the type and attribute of the biometric to be used for verification 725. In order to decide between the two types of biometrics, the authentication service 190 may have a predetermined hierarchy in which the finger type is preferred over the voice type. This hierarchy may be established in any number of ways—it may be a specified arrangement between the enterprise 130 and the authentication service 190, or it may be established based on whether one type of authenticator has a higher level of trust as compared with another. Here, the authentication service 190 prefers the finger type as compared to the voice type, and more specifically prefers a fingerprint sample (attribute).

It is also noted that the hierarchy—category, type, attribute—established in Table 1 may include additional elements. While this is a three-level hierarchy, the enrolled credentials may lend themselves to different hierarchical structures. The function of the hierarchy is to provide some logical basis so that the enterprise 130 can provide some sort of policy at a macroscopic level in the authentication service 190 and select or determine a credential at a microscopic level that fits the policy. The concept is that a multitude of potential credentials of various kinds, and with various levels of trust, can be centralized with the authentication service 190 so that the enterprise 130 need not keep track on a user by user basis, a device by device basis, and on the credential by credential basis, what possible credentials are available for authenticating a user for a particular transaction.

Now after selecting the type of sample to use for verification based on the policy received from the enterprise 130, the authentication service sends a request to the user device 101 for a fingerprint sample 730. The user device 101 displays a request for a sample to the user 732. The user applies their finger to the device 101 and the user device 101 collects a sample 735. The user device encrypts the sample using key PK of key pair D1 (encrypt [FINGERPRINT] PK) and transmits 738 the sample to the authentication service 190. The authentication service then decrypts the sample using the other key PK' of the key pair D1 (decrypt [FINGERPRINT] PK') and verifies the sample 740. Upon a successful verification, the authentication service 190 then transmits a message for a user to enter credit card information to the user device 101 745. The user enters the credit card information, the card information is encrypted using one key PK of key pair D1' 750 and then transmitted 755 to the authentication service 190. The authentication service 190 relays encrypted information 760 to the enterprise 130 information indicating that the user was verified including the category, type and attribute to verify the user—"successful verification using fingerprint".

Additionally, in the event that the authentication service 190 does not find an enrolled credential satisfying the enterprise's policy request, the authentication service 190 can send a message back to the enterprise 130 indicating that the user has not enrolled this category, type or attribute of credential.

Next, a process in which the authentication service 190 selects the category, type and attribute for verification when the user has multiple devices enrolled with the authentication service 190 is discussed with reference to FIG. 8.

Again, this process incorporates the relationships and key pairs established in FIG. 2. The policy is applied to the user's enrolled credentials where the user may have multiple devices enrolled with the enterprise 130. The process begins when the user engages the enterprise 130 to perform some transaction. In this case, user is making a purchase 810 from the enterprise 130. To complete the purchase, the enterprise 130 sends a request 815 to the authentication service 190 to verify the user and to capture the account information from the user's credit card. This request also includes a policy request regarding the verification of the user. In this example, assume the transaction is for substantially high purchase amount. Rather than elect to receive a mere password from the user, in this case the enterprise 130 sets the policy to require an eye biometric from the user. In this request, the enterprise identifies the relationship with the user using the relationship ID (REL-ID #1). As describe above with regard to FIGS. 1 and 2, the relationship is between a specific user device 101 (DEV 1) and the enterprise 130. Next, using the relationship ID the authentication service 190 identifies the account ID associated with the user device 101 (DEV 1) which is tied to the relationship ID.

After accessing the enrolled credentials for the user's account (Table 1) 820 the authentication service 190 determines that there is an enrolled credential for the biometric category under the type "eye". However, the authentication service 190 also can determine that DEV 1 either does not have this credential enrolled or is not capable of providing a sample for the users "eye" 825. In this instance, the authentication service 190 may transmit a message back to the enterprise 130 informing the enterprise 130 that user device 101 is not capable of obtaining an eye sample. The enterprise 130 may inform the user that this transaction is not available unless the user has a device enrolled with the authentication service 190 having "eye sample" capabilities. The user may then elect to establish a relationship with the enterprise 130 in the manner set forth above with regard to FIG. 2.

Figure 8:
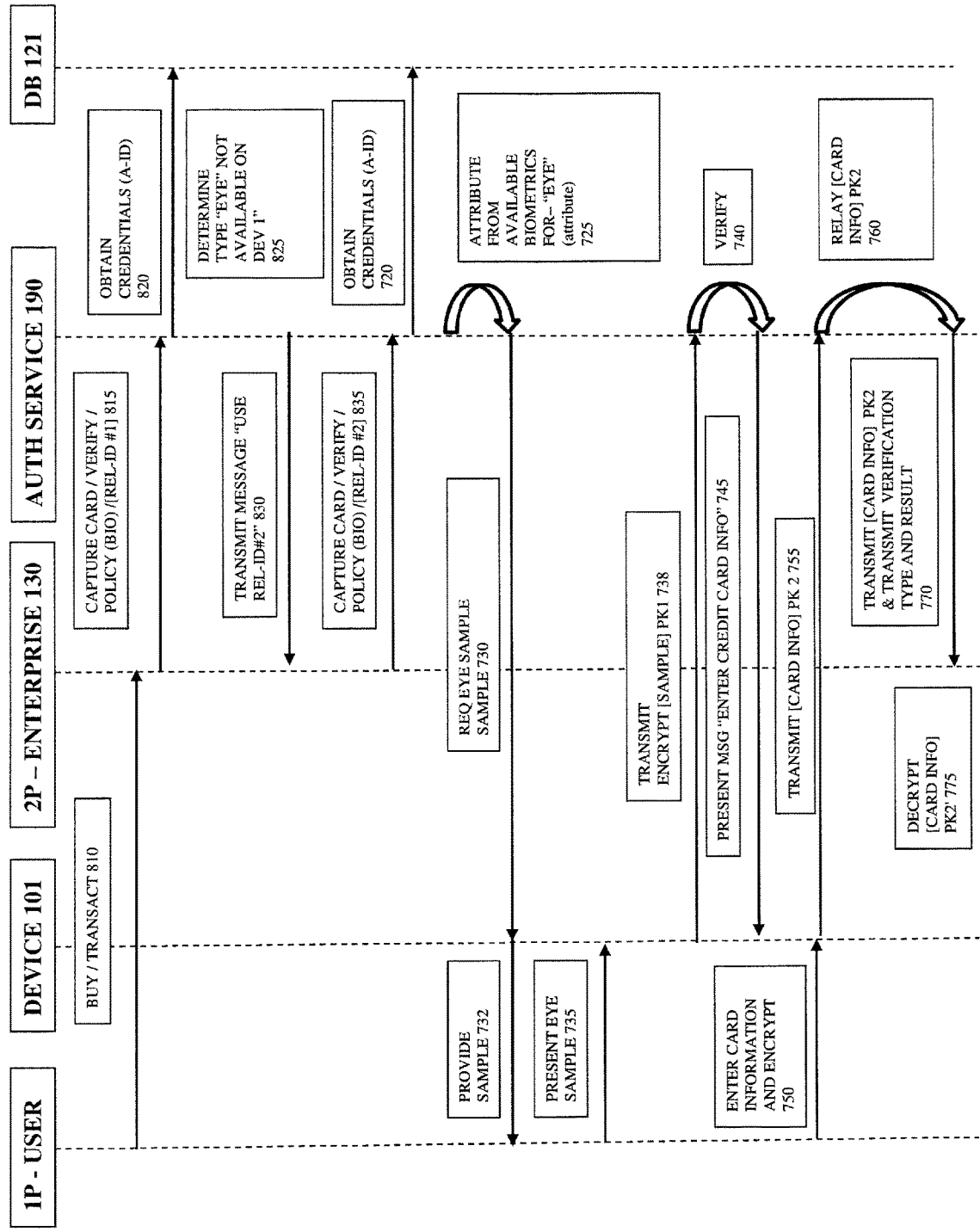
FIG. 8 shows a process of a user using a phone to emulate a dynamic wireless credential to conduct a transaction.

Alternatively, as shown here with regard to FIGS. 6 and 8, for purposes of explanation we will assume that the user has two devices (DEV 1 and DEV 2) enrolled with the authentication service 190, and each device has an independent relationship (REL-ID #1, REL-ID #2) established with the enterprise 130. Different relationships are established for each device as each key pair D1 between a specific user device 101 and the enterprise 130 is separately established. Here, relationships associated with the two devices (REL-ID #1, REL-ID #2) can be associated by the account ID of the user. Alternatively, some sort of user ID may be established to make these associations while maintaining the anonymity of the actual user.

An operation 825, the authentication service 190 with reference to Table 1 of FIG. 6 can determine that a verification of an "eye" sample may be performed using another device DEV 2. In this instance, the authentication service 190 may transmit a message to the enterprise 130 suggesting that the enterprise 130 use the relationship (REL-ID #2) which associates enterprise 130 with the user device DEV 2. Now the enterprise can resend a request similar to the request sent in operation 815, but with a different relationship ID (REL-ID #2). The process now proceeds in the same manner as set forth in FIG. 7, with the exception that an eye sample is required instead of a fingerprint sample.

V. Token Storage/Attestation

1. Key/Token Storage

Another concept that can be built on the system described in FIGS. 1 and 2 is the key storage or token storage concept. Here, in addition to the key pairs and relationships set up as described above, another level of security is added to something that may be stored with the enterprise. For example, in the case of digital currency, which is often stored in exchanges, if the exchange is hacked the digital currency can be stolen. By using the authentication service 190, a user can provide additional security for the digital currency being held in exchange (enterprise).

According to this embodiment, to establish this additional layer of security, the user would engage the enterprise 130 to set up an account. Part of the account set up entails creating a multi-key environment where the keys are stored in different locations so that if one of the locations is compromised the security built upon the key pairs is not broken. To accomplish this, when setting up the account, the enterprise 130 generates a first key pair. One of these keys goes back to the user K1 (may be a key or password) and the other key k2 is stored with a trusted third party—the authentication service 190. This key K2 is encrypted using an asymmetric key pair (KP, KP') by the authentication service 190 and stored with the authentication service 190 K2' (K2'=encrypt [K2] KP). The authentication service destroys the key KP used to encrypt the key K2 and also destroys the key K2. The other asymmetric key KP' is passed back to the enterprise 130. Thus, the authentication service 190 only holds an encrypted form of K2, but does not hold the key KP' which can decrypt the encrypted form. Another facet to this enhanced security is a requirement that when the user wishes to use the account at the enterprise, the user cannot merely make a request of the enterprise, but instead must authorize the verified user device based on the relationship the user device has set up with the authentication service.

Figure 9:
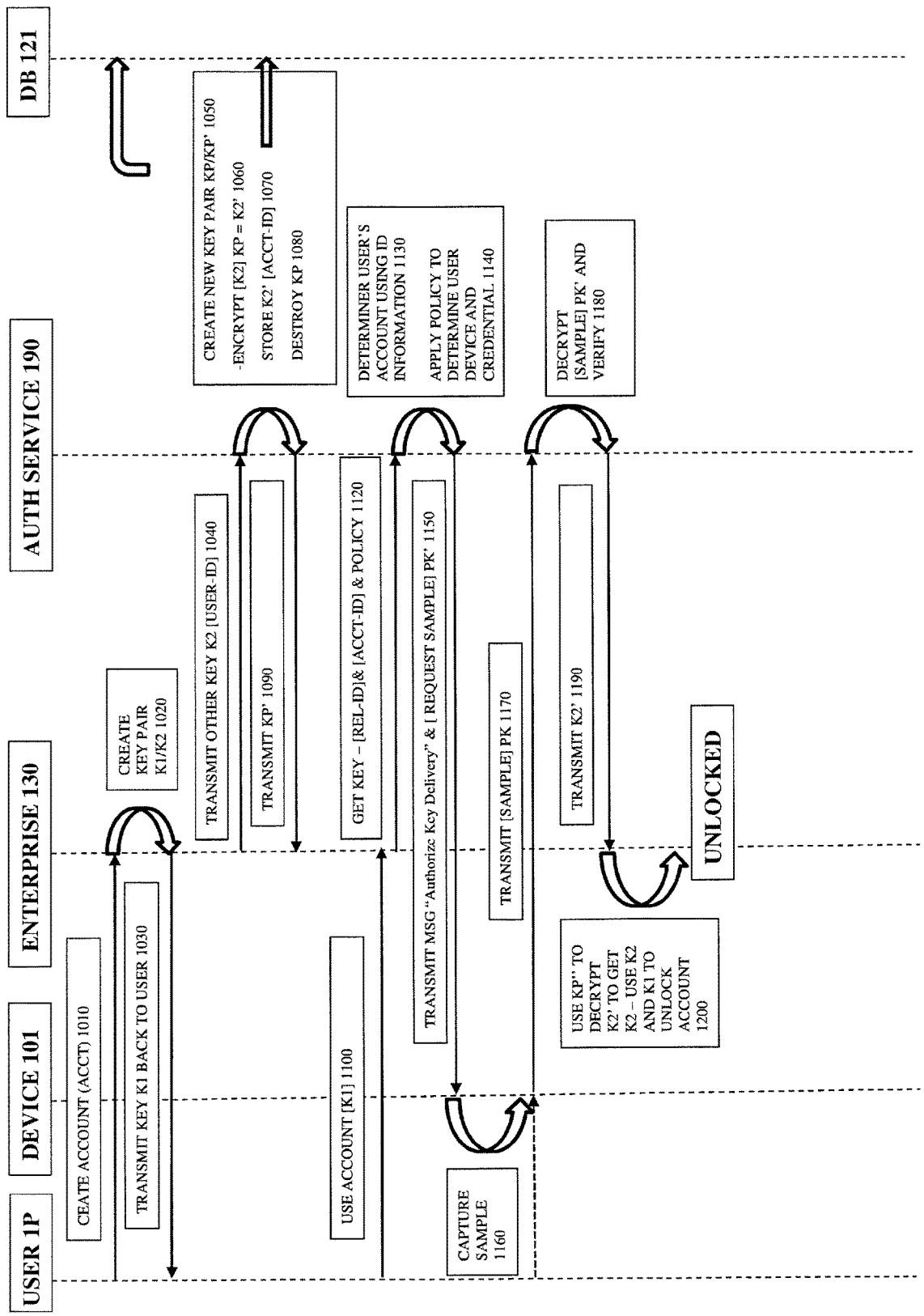
FIG. 9 shows a manner of securely storing key or token in accord with an embodiment of the present application.

FIG. 9 shows a process in accord with this embodiment for establishing a secure storage for an item using key pairs established between the user, the enterprise and the authentication service.

Initially, the user makes a request to set up an account 1010 with the enterprise 130. As a part of this process, a key pair (K1, K2) is created between the user and the enterprise 130 in order to secure the account. Here, the key pair need not be asymmetric. The only requirement is that both keys (K1, K2) be required to unlock the account. For example, the key K1 may be a password selected by the user or a key that is stored on the user's device. When K1 is a key generated by the enterprise 130, not the user, it is transmitted back to the user 1030. After the key pair is generated, the second key K2 is transmitted 1040 to the authentication service 190 with some sort of indicia to associate the key K2 with the user's account ID (ACCT-ID). While the relationship ID (REL-ID) associating the relationship between enterprise 130 and the user device 101 may be used, a user ID (USER-ID) which would anonymously associate the user with the account may be used to identify user's account ID (ACCT-ID) so that key K2 can be utilized by any user device.

After receiving the key K2 from the enterprise 130, the authentication service creates new key pair (KP, KP'), which in the preferred embodiment is an asymmetric key pair. The first key KP of the key pair is used to encrypt the key K2 received from the enterprise 130 to generate key K2', which is encrypted form of K2 (K2'=encrypt [K2] KP). The authentication service 190 stores K2' in association with the user's account ID (ACCT-ID) which can be identified by user ID (USER-ID) received from the enterprise 130. In the event that the enterprise 130 uses the relationship ID (REL-ID) as established in the procedures described above, the authentication service 190 could identify the account ID of the user using the relationship ID via the device ID. The second key of the asymmetric key pair KP' is transmitted 1090 back to the enterprise 130 to be stored. This is the only key that can be used to decrypt the encrypted form of key K2. This key KP' may be accompanied by some identifier so that the enterprise 130 and the authentication service 190 may be able to identify the key bundle K2' in the event that the keys from multiple accounts are stored with the authentication service 190.

Next, the authentication service 190 destroys the keys KP, KP' used to encrypt/decrypt the key K2 received from the enterprise 130 and does not store the key K2. That is, by some manner these keys are destroyed so that if the security of the authentication service 190 is compromised they cannot be stolen. Consequently, encrypted form of K2 (K2') is stored with the authentication service 190 and the only key (KP') capable of decrypting K2' is stored with the enterprise 130. Now, the user's account at the enterprise 130 is secured by keys K1, K2 and the key K2 is stored at the authentication service 190 in an encrypted bundle has K2'. This encrypted bundle can only be decrypted by the key KP' stored with the enterprise 130.

The process for using the account established with the enterprise after establishing the key bundles is described below. First, the user sends a request 1100 to the enterprise 130 to use the account established with the enterprise 130 and the user provides the key K1 to the enterprise 130. In response, the enterprise 130 sends a request 1120 to get the required key bundle K2' in order to access/unlock the account. This request is sent with an identifier so that the user's account (ACCT-ID) can be identified. This identifier may be a relationship ID (REL-ID) or some other identification that would serve the same purpose. The authentication service 190 uses this information to find the proper account ID (ACCT-ID) in order to locate the appropriate key bundle K2'. The request 1120 may also include the policy to be applied by the authentication service 190 when verifying the user through the user device 101.

Next, the authentication service 190 applies the policy sent with request 1120 to determine the proper user device and/or credential 1140 to be used to verify the user through the user device 101. The authentication service 190 then transmits a message 1150 to the user device 101 to "Authorize Key Delivery" and also a request for a credential from the user to be applied through the user device 101. This message may be encrypted using the key PK' that would be established as described above with regard to FIGS. 1 and 2. The message is decrypted by the device 101 using key PK and the user device captures a sample 1160. The sample is then encrypted using key PK and transmitted back to the authentication service 190 for verification 1170. The authentication service 190 decrypts the message using key PK' and verifies the sample 1180. If the user is properly verified the authentication service 190 then transmits 1190 the key bundle K2' to the enterprise 130. The enterprise then uses the key KP' to decrypt the key bundle K2' to get the key K2 (decrypt [K2'] KP'=K2). Now the enterprise 130 using keys K1 and K2 can unlock the account for the user.

It is noted that all communications between the user device 101 enterprise 130 the authentication service 190 can be encrypted and decrypted using the keys relationships established above with regard to FIGS. 1 and 2. Additionally, verification of the user can be performed using any of the embodiments described above with regard to FIGS. 1-8.2

2. Attestation

Another concept that can be built on the system described in FIGS. 1 and 2 is the third party attestation concept. Here, in addition to the key pairs and relationships set up as described above, the authentication service 190 can store some sort of attestation (ballot for voting, verification of age, proof of credit, etc.) that is provided by trusted third party (government agency, bank, etc.). For example, in the embodiment described below, the department of motor vehicles attests that the user is over the age of 21. This attestation may be used by the user to purchase alcohol via a web transaction—where it is not convenient to provide physical proof of age.

Figure 10A:
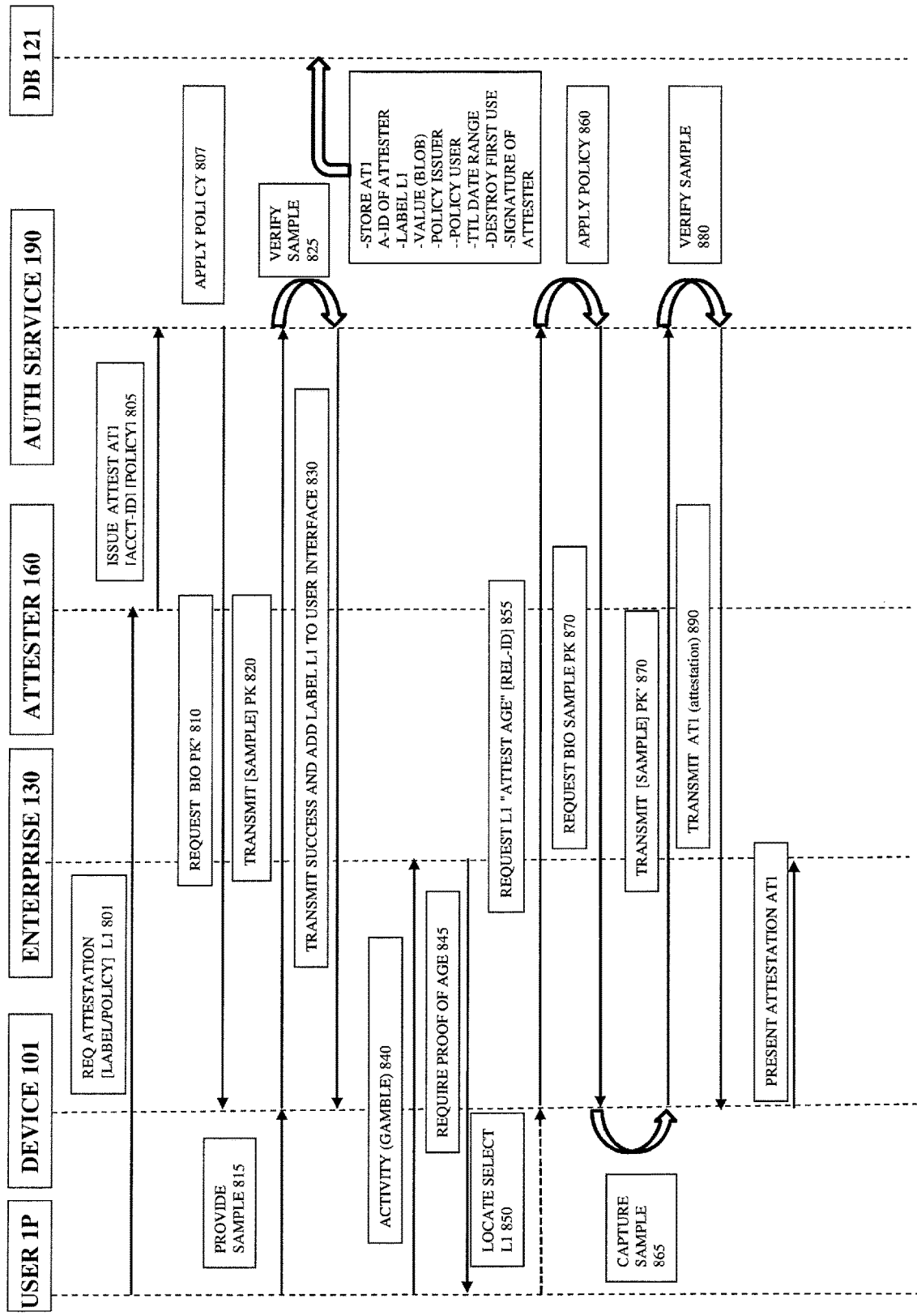
FIGS. 10A and 10B show a process for obtaining and providing a third party attestation to an enterprise.

FIG. 10A shows a process in accord with this embodiment for obtaining an attestation from an attester 160, storing the attestation with the authentication service 190 and providing the attestation to an enterprise 130. In this embodiment, key pairs and relationships are presumed be established between each of the parties and the authentication service set forth above with regard to FIGS. 1-8.

Initially, the user issues a request 801 to the trusted third party, attester 160, to issue an age attestation. The request can include a human readable label L1 "Age Attestation" that describes the attestation and request regarding policy to be applied when verifying the user before providing the attestation to an enterprise 130. In response, the attester 160 issues an attestation AT1 and transmits the attestation with an identifier to identify the account of the user. The attester 160 may also submit a policy request with the attestation AT1 to be applied when verifying the user prior to storing the attestation with the authentication service 190 in the user's account.

Before storing the attestation AT1, the authentication service 190 locates the user's account using the identifier and applies the policy to determine the device and the credential to use for verification 807. The authentication service 190 then sends an encrypted request for a sample 810 to the user device 101. The user device 101 decrypts the message and displays to the user that a sample is requested to verify the user 815. The user device 101 encrypts and transmits the sample back to authentication service 190 for verification 820. After the authentication service 190 verifies the user based on the sample, a message is transmitted back to the device 101 with the human readable label L1 for the attestation that indicates that the attestation successfully stored with the authentication service 190. Following verification of the user, the authentication service 190 also stores the attestation in association with the user account (ACCT-ID).

In the example above, an attestation of age is provided by the attester 160. However, the present embodiment contemplates other types of attestations. These may include verification of credit, ballots, coupons or any other attestation that typically requires some sort of physical credential for support. While the attester 160 provides the age attestation in operation 805 with an identifier and the policy request, the attestation AT1, may include other limiting criteria to be stored with attestation at the authentication service 190. Such limiting criteria may include information: (1) destroy on first use; (2) time to live TTL; or (3) an effective date range. The information may also include a time stamp (when issued) or a uniform resource identifier URI to enable the enterprise 130 to later validate the attestation.

Additionally, when the attestation AT1 is stored, it is also stored with the information provided by the user in step 801 and the attester 160 in step 805. In particular, the attestation may be stored with the human readable label L1, the policy of issuer, the policy of the user, a time to live or date range. It is also noted that the attestation AT1 to be stored in encrypted form.

Now that the attestation has been stored with the authentication server 190, the user may use attestation when needed. The process for doing so is described in FIG. 10 beginning with operation 840. Here user elects to engage with a gambling enterprise 130. The gambling enterprise 130 requires proof of age before the user can gamble. Now the user can rely on the stored attestation of age without having to show any physical proof to the gambling enterprise. Using the user device 101, the user locates and selects the label L1 for age attestation and the user device 101 transmits a request with the label L1 and the relationship ID (REL-ID) to the authentication service 190.

In response to the request, the authentication service 190 applies the policy 860 set by the user in operation 801 to select the credential required for verification of the user. The authentication service 190 then sends a request for a sample 870 to user device 101, which requests a sample from the user 865. After capturing the sample, the sample is transmitted back the authentication service 190 which verifies the sample 880. Upon a successful verification, the authentication service 190 transmits 890 the attestation AT1 back to the user device 101.

Alternatively, that attestation AT1 may be transmitted 891 directly back to the enterprise 130.

Figure 10B:
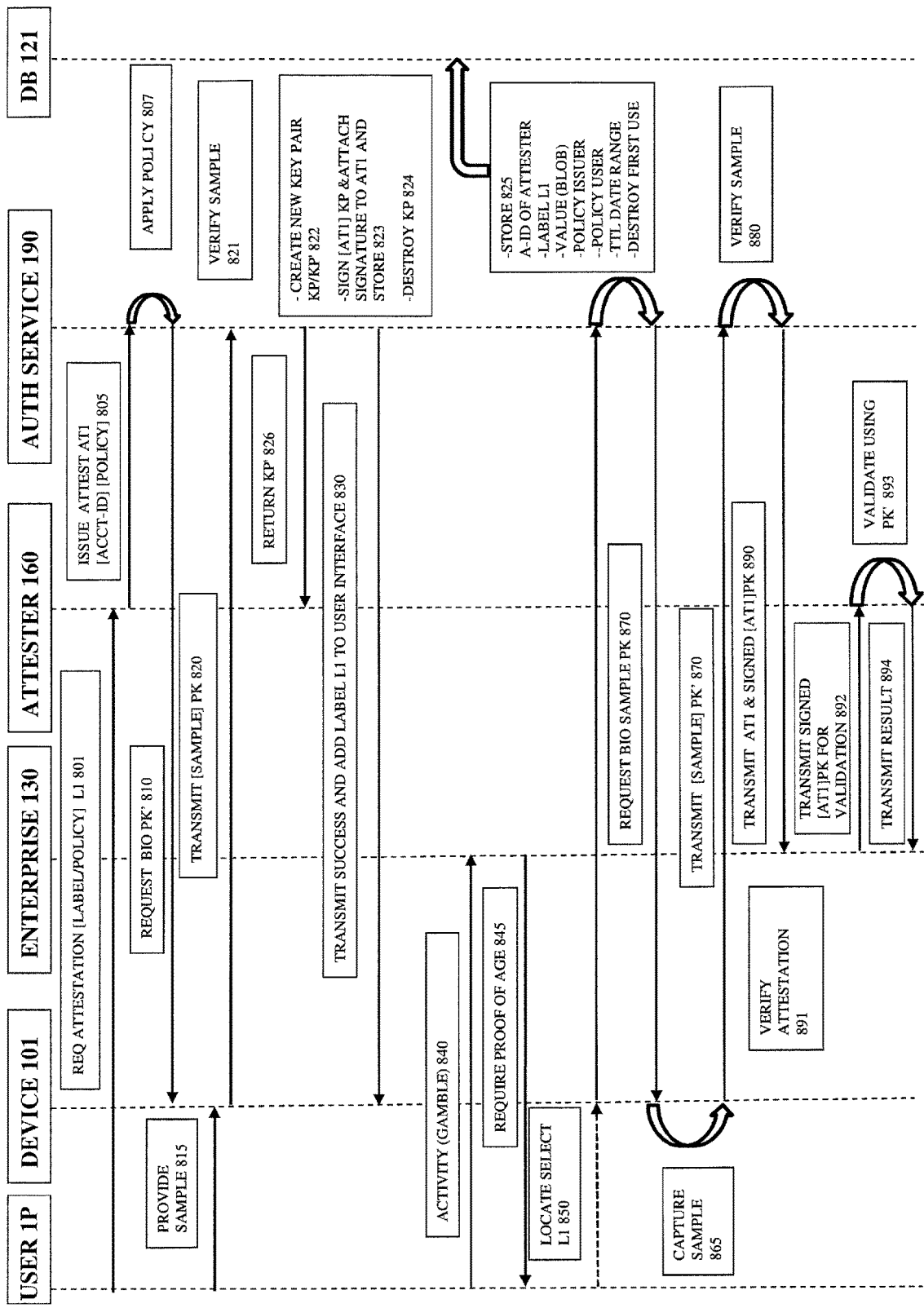

It is also noted that the attestation AT1 can be stored in encrypted form using the structure outlined in FIG. 9 with some modification. Doing this functions to provide additional security for sensitive data—account data, personal information, etc. A process for storing the attestation in this manner is shown in FIG. 10B.

The process for obtaining an attestation follow operations 801 through 821 of FIG. 10A. However, after receiving the attestation AT1 from the attester 160, the authentication service 190 generates an asymmetric key pair (KP, KP') 822, signs the attestation using the key KP, and adds signed [ATI] KP to the attestation AT1 823. The authentication service destroys the key KP 824 and transmits 826 that other key KP' to the attester 160.

The process for using the attestation follows flow of FIG. 10A in operations 840 through 880. However, in this case, the attestation AT1 is transmitted 890 with the signed AT1 to the enterprise 130. The enterprise then verifies the attestation 891. While the enterprise 130 may verify this attestation using some know algorithm, in this case, the enterprise transmits 892 the attestation AT1 and the signed [AT1] KP to the attester 160. The attester 160 then validates 893 the attestation using the key KP' to ensure that the attestation AT1 has not been modified. The result of this validation is then transmitted back to the enterprise 894.

What is claimed is:

1. An authentication server to authenticate a user in communication with an enterprise via a network, comprising:
   a memory to store a plurality of authenticators received via the network from a device associated with the user; and
   a processor to:
      receive, from the enterprise, a request to authenticate the user in accordance with an authentication policy to authenticate the user, wherein the request does not identify which of the stored plurality of authenticators is to be used to authenticate the user, the authentication policy to establish a type of authenticator to be used to authenticate the user;
      determine a first stored authenticator from the stored plurality of authenticators to be used to authenticate the user based on the authentication policy received from the enterprise;
      transmit an authentication request, to the device via the network, for the first stored authenticator; and
      in response to the authentication request, receive from the device, an authenticator at least partially derived from data from hardware of the device in response to the authentication request, and authenticate the user responsive to a comparison of the received authenticator with the first stored authenticator.

2. The authentication server of claim 1, wherein the received authenticator at least partially derived from the data from the hardware of the device corresponds to a device ID.

3. The authentication server of claim 2, wherein the device ID is not clone-able.

4. The authentication server of claim 2, wherein the device ID is immutable.

5. The authentication server of claim 1, wherein the hardware of the device corresponds to a card inserted into the device.

6. The authentication server of claim 1, wherein the processor is additionally to generate a relationship between the enterprise and the device associated with the user.

7. The authentication server of claim 1, wherein the processor is additionally to wirelessly transmit a one-time-code to the device.

8. A method of authenticating a user, comprising:
   storing a plurality of authenticators, received via a network, that relate to a communications device co-located with the user;
   receiving, from an enterprise, a request to authenticate the user according to an authentication policy to authenticate the user, wherein the request does not identify which of the stored plurality of authenticators is to be used to authenticate the user, wherein the authentication policy establishes a type of authenticator to be used to authenticate the user;
   determining a first stored authenticator from the stored plurality of authenticators to be used for authenticating the user based on the authentication policy received from the enterprise;
   transmitting an authentication request, to the communications device via the network, to obtain the first stored authenticator;
   receiving from the communications device, in response to the authentication request, an authenticator at least partially derived from data from hardware of the communications device in response to the authentication request; and
   authenticating the user by comparing the received authenticator with the first stored authenticator.

9. The method of claim 8, wherein the received authenticator at least partially derived from the data from the hardware of the communications device corresponds to a device ID.

10. The method of claim 9, wherein the device ID is not clone-able.

11. The method of claim 9, wherein the device ID is immutable.

12. The method of claim 8, wherein the hardware of the communications device corresponds to a card inserted into the communications device.

13. The method of claim 8, further comprising:
   generating a relationship between the enterprise and the communications device associated with the user.

14. The method of claim 8, further comprising:
   wirelessly transmitting a one-time-code to the communications device.

15. An article comprising a non-transitory computer readable media having instructions encoded thereon which, when executed by a computing device, cause the computing device to:
   receive from an enterprise, a request to authenticate a user in accordance with an authentication policy, wherein the request does not identify which of a plurality of stored authenticators is to be used to authenticate the user, wherein the authentication policy establishes a type of authenticator to be used to authenticate the user;
   determine a first stored authenticator from the plurality of stored authenticators is to be used to authenticate the user based on the authentication policy received from the enterprise;
   transmit an authentication request, to the device via a network, for the first stored authenticator; and
   in response to the authentication request, receive, from the device, an authenticator at least partially derived from data from hardware of the device in response to the authentication request, and authenticate the user responsive to a comparison of the received authenticator with the stored first authenticator.

16. The article of claim 15, wherein the received authenticator at least partially derived from the data from the hardware of the device corresponds to a device ID.

17. The article of claim 16, wherein the device ID is not clone-able.

18. The article of claim 16, wherein the device ID is immutable.

19. The article of claim 15, wherein the hardware of the device corresponds to a card inserted into the device.

20. The article of claim 15, wherein the computing device is additionally to generate a relationship between the enterprise and the device associated with the user.

\* \* \* \* \*